Oct. 27, 1953     T. R. DAMES ET AL     2,656,718
SOIL SHEAR TESTING MACHINE
Filed Feb. 19, 1949     14 Sheets-Sheet 1
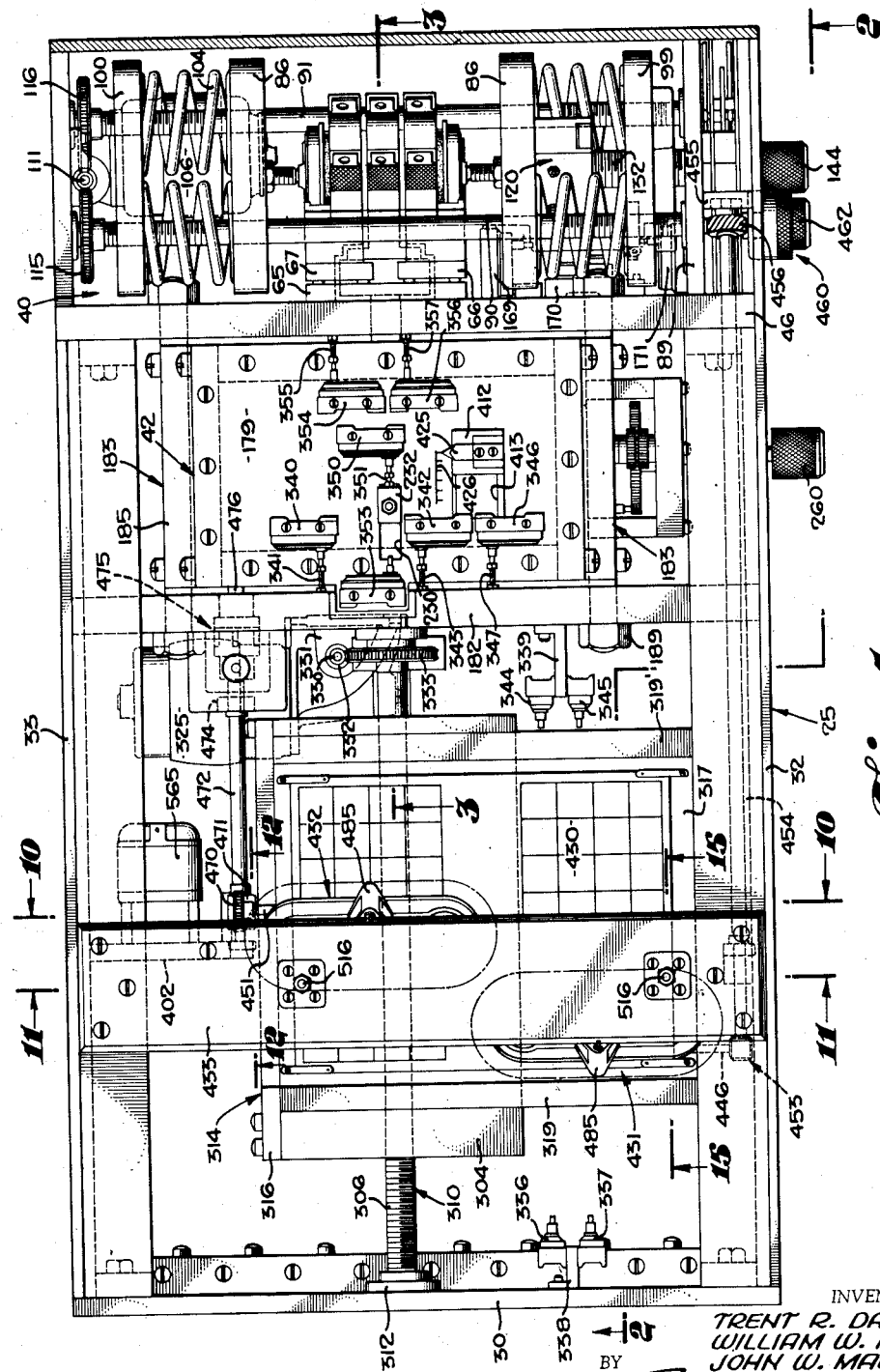
Fig. 1.
INVENTORS
TRENT R. DAMES
WILLIAM W. MOORE
JOHN W. MALONEY
BY
ATTORNEY.

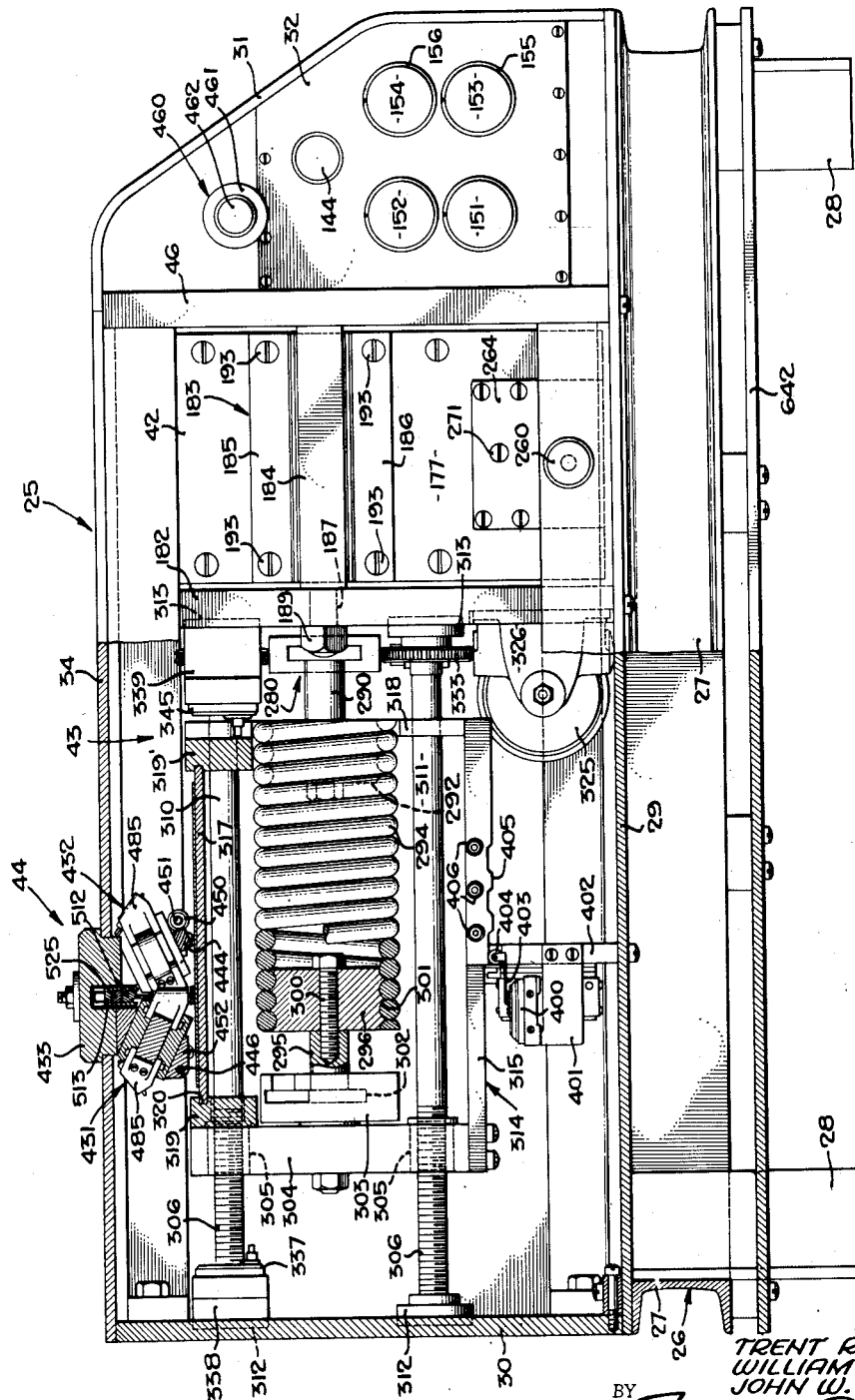

Oct. 27, 1953
T. R. DAMES ET AL
2,656,718
SOIL SHEAR TESTING MACHINE
Filed Feb. 19, 1949
14 Sheets-Sheet 3
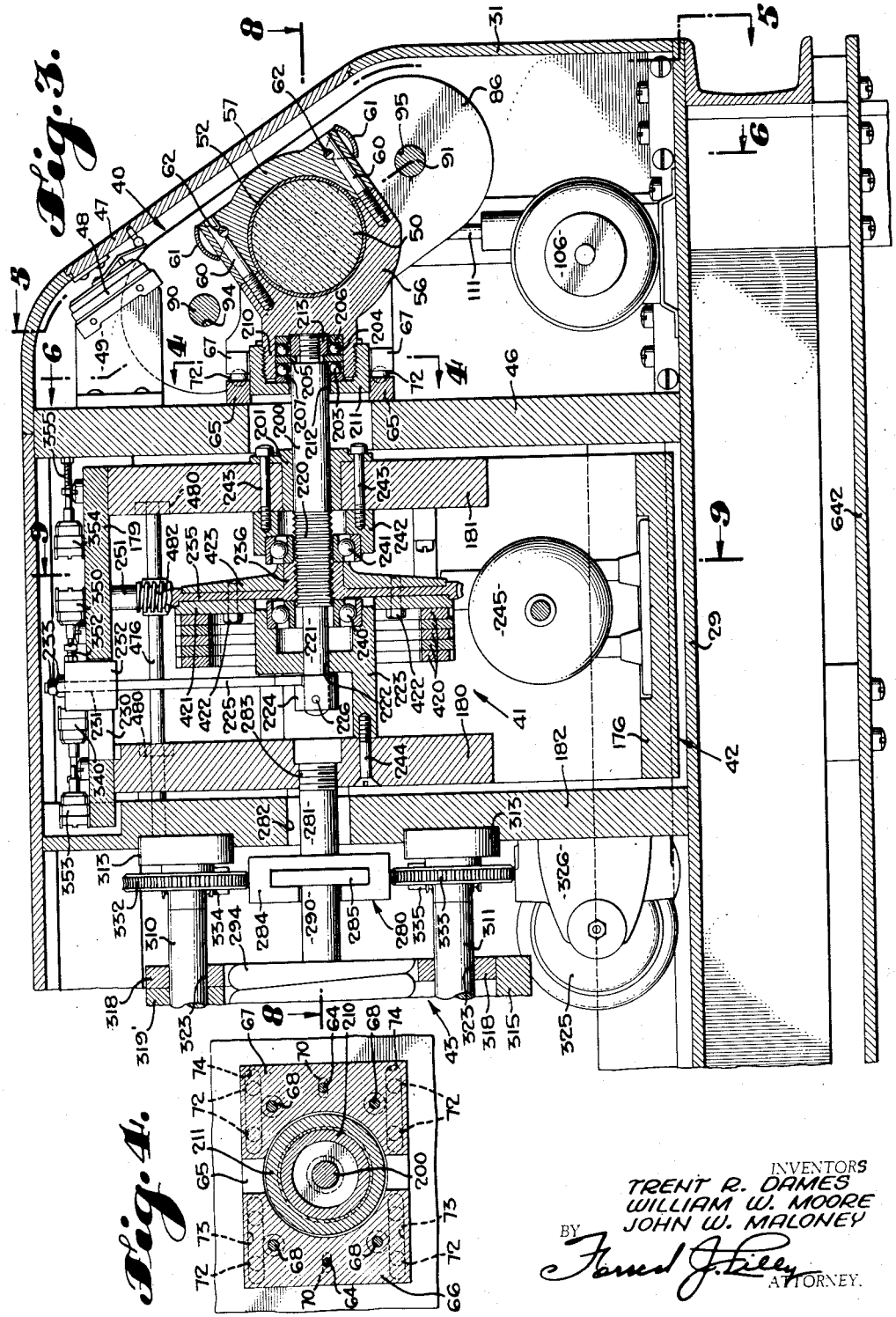
INVENTORS
TRENT R. DAMES
WILLIAM W. MOORE
JOHN W. MALONEY
BY Farrest J. Lilly
ATTORNEY.

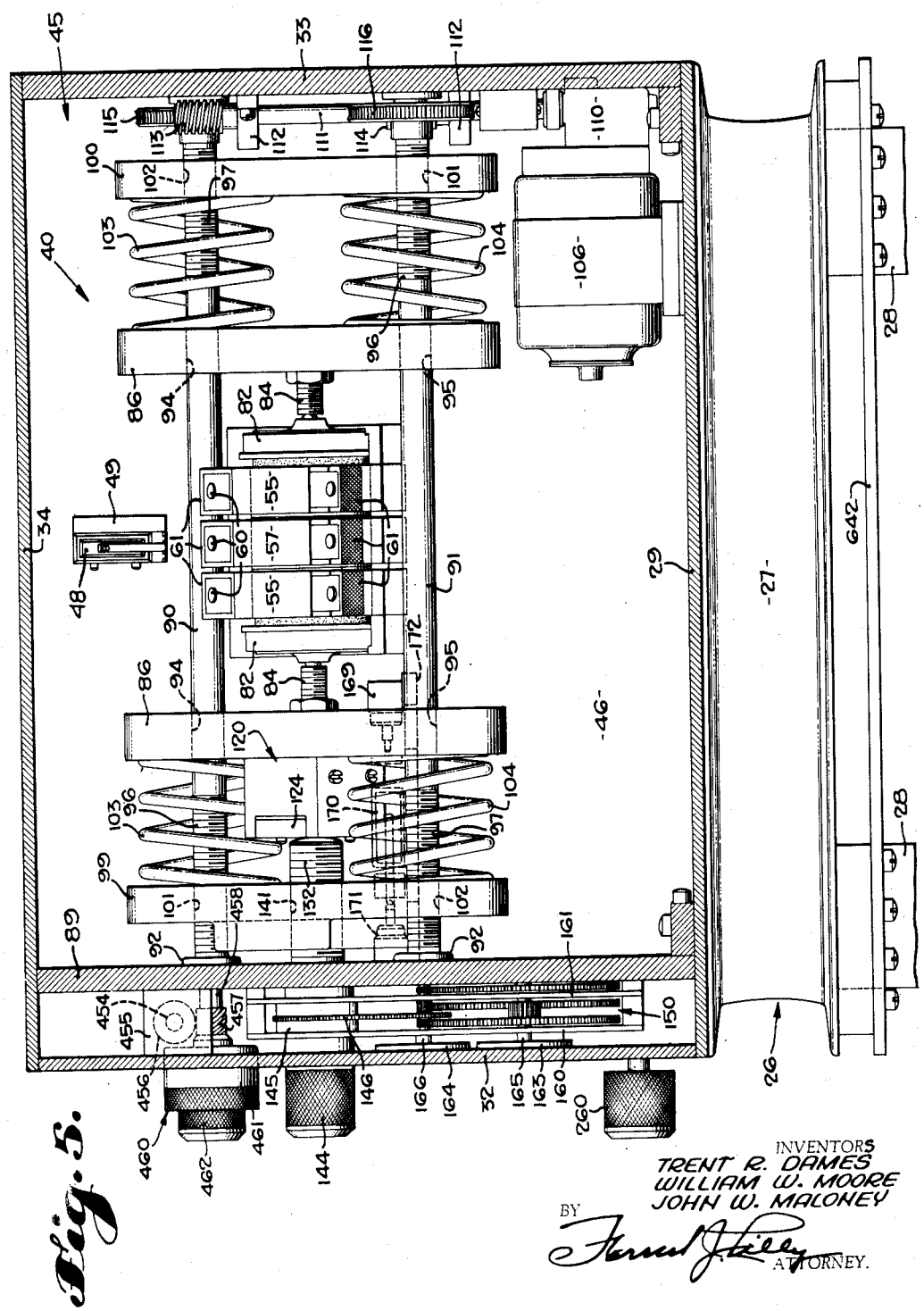

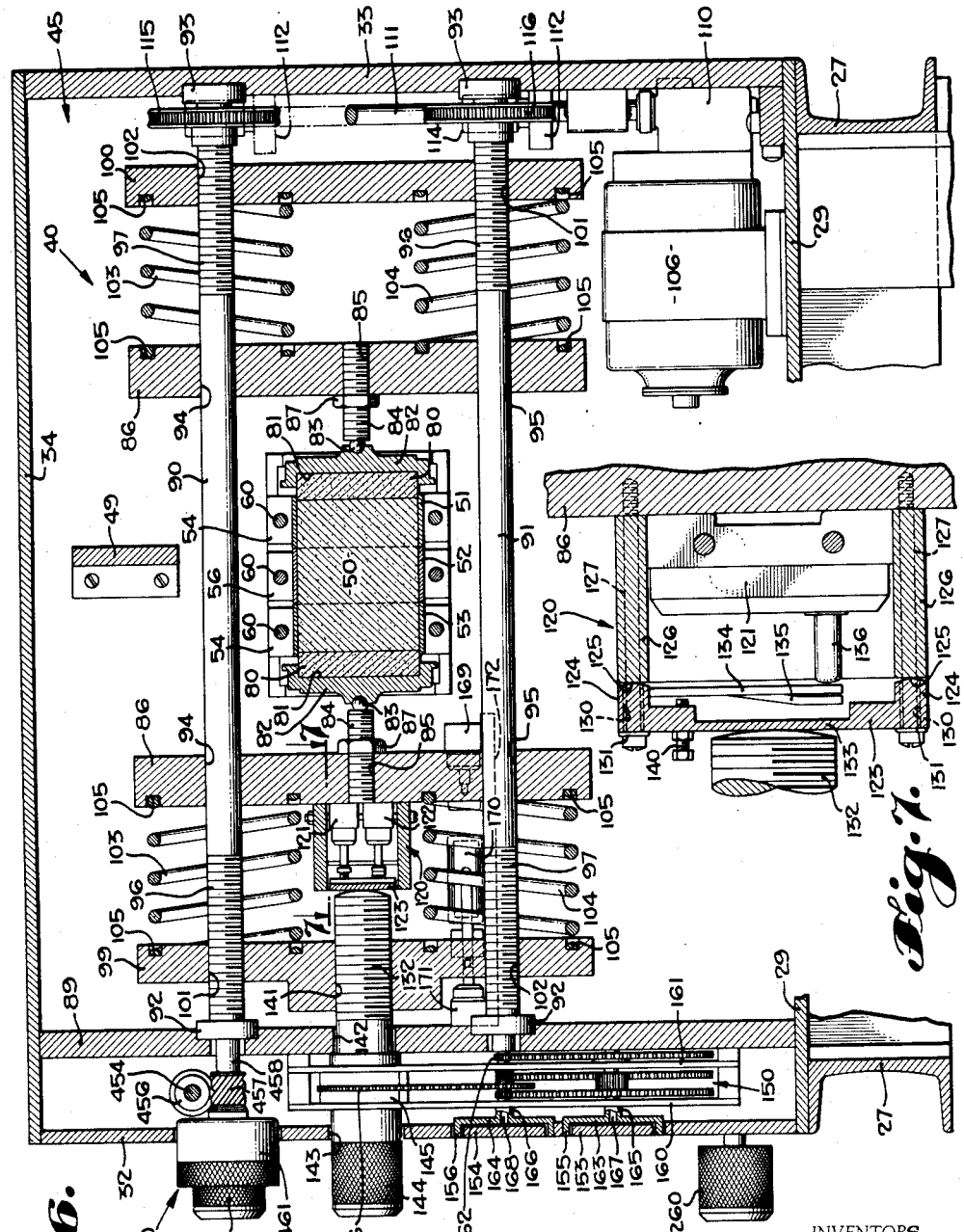

INVENTORS
TRENT R. DAMES
WILLIAM W. MOORE
JOHN W. MALONEY
BY
ATTORNEY.

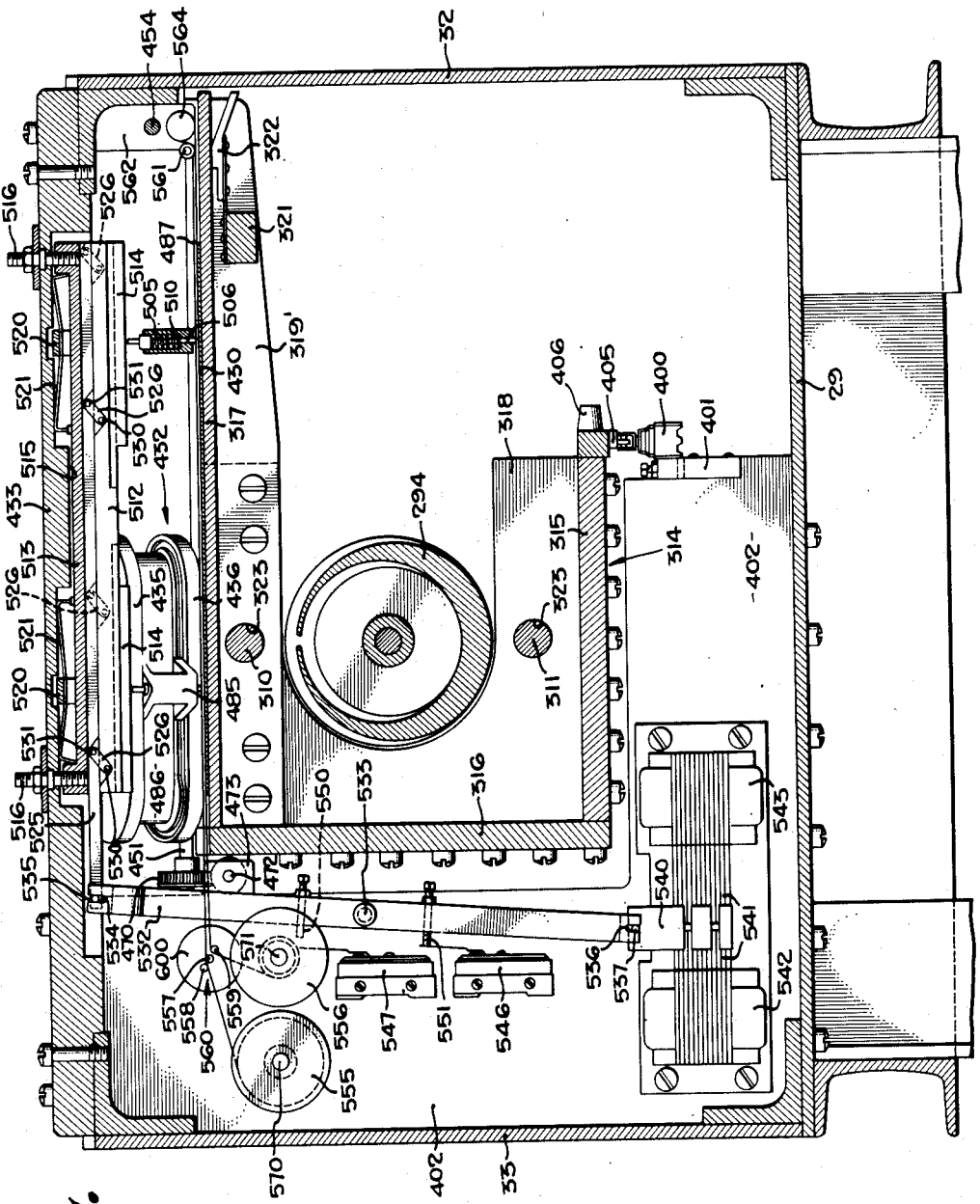

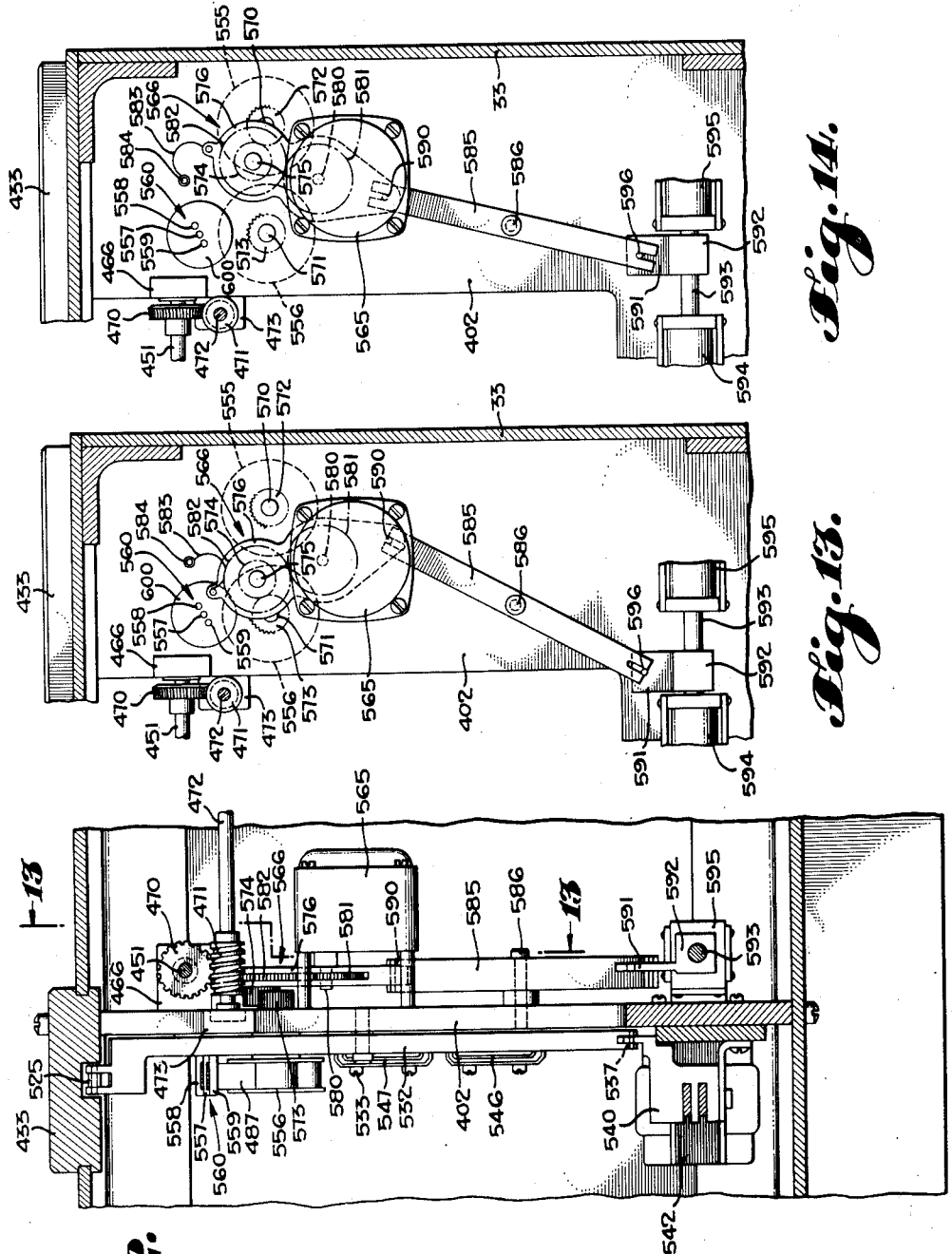

Oct. 27, 1953  T. R. DAMES ET AL  2,656,718
SOIL SHEAR TESTING MACHINE
Filed Feb. 19, 1949  14 Sheets-Sheet 11

INVENTORS
TRENT R. DAMES
WILLIAM W. MOORE
JOHN W. MALONEY
BY
ATTORNEY

Oct. 27, 1953 — T. R. DAMES ET AL — 2,656,718
SOIL SHEAR TESTING MACHINE
Filed Feb. 19, 1949 — 14 Sheets-Sheet 12

INVENTORS
TRENT R. DAMES
WILLIAM W. MOORE
BY JOHN W. MALONEY
ATTORNEY

Patented Oct. 27, 1953

2,656,718

UNITED STATES PATENT OFFICE 2,656,718

SOIL SHEAR TESTING MACHINE

Trent R. Dames, San Marino, William W. Moore, San Francisco, and John W. Maloney, Alhambra, Calif.

Application February 19, 1949, Serial No. 77,382

29 Claims. (Cl. 73—90)

The present invention relates to materials testing machines, and more particularly to a machine for determining the shearing strength of soil samples taken from different locations and depths at the site of a proposed structure, or for ascertaining the frictional values of soil against some other material, so that accurate and reliable data can be formulated as to the load-bearing capacity or sliding characteristics of the soil. Such information is essential in setting up the design specifications of structural foundations, and enables the structural engineer to utilize the maximum economies in the foundation design without jeopardizing the integrity of the structure.

The shearing strength and frictional values of soil samples are useful also in determining the safe loading for driven piles, as described in the Dames and Moore Patent 2,296,466, September 22, 1942, entitled "Method of Determining Driven Friction Pile Capacities," as well as in other analyses of the loading and pressure conditions obtained on retaining walls, quay walls, bulkheads, and the like. The stability of soil bodies such as earthen embankments and fills, or the sides of excavations, can also be determined accurately when the shearing strength and frictional values of the soil are known; and the sliding characteristics of the sides of a cut can be analyzed to ascertain the factor of safety. Another important use to which such information can be put is in determining the strength of a sub-grade, so that the minimum required thickness for pavement can be established.

While the present invention is primarily concerned with the testing of soils, we wish to make it clear that the machine is not limited solely to such use, but might also be employed in the testing of other materials having shearing and frictional properties generally similar to those of soil, such as sugar or borax, for example, both of which have already been tested in connection with problems relating to the design of bins and hoppers.

The soil samples to be tested are cylindrical cores which are contained within three adjoining, separable rings; such samples being usually obtained with any suitable core sampling device, such as the preferred type shown and described in Dames' Patent 2,318,062, granted May 4, 1943. The sampler of the patent is in the nature of a hollow tubular body having a sharp cutting edge at the bottom end thereof, with a plurality of thin-walled core retaining rings contained within the body. The sampler is driven into the ground, usually at the bottom of a bore, and when withdrawn, lifts the cores with it. The core retaining rings are then removed from the body, and separated into sections of three rings each; each of said 3-segment sections forming a single sample for use in the present machine.

Among other factors, the shear strength of the soil at a given point is a function of the natural underground soil pressure prevailing at that point; hence, for a given type of soil, the greater the depth below the surface, the greater is the pressure, and the higher the shear strength. In order to obtain an accurate shear strength value for a given soil sample, it is necessary therefore to apply a "surcharge" or compression force to the specimen accurately duplicating the natural underground soil pressure existing at the site from which the sample was taken, or simulating the anticipated pressure at the site under consideration.

One of the problems encountered in the design of a surcharging mechanism is that of maintaining the surcharge force at a constant value throughout the test. For example, it is not uncommon for a soil sample to "give" or compact slightly after being held under load for some time, which causes an appreciable shortening in the length of the sample, with a corresponding reduction in the applied surcharge pressure unless suitable provision is made for "follow-up." Or, during the shearing of the sample, the relative sliding movement of the grains in the movable segment over the grains in the stationary segment may cause a slight expansion in the length of the sample, with an attendant increase in the surcharge pressure unless suitable provision is made to accommodate such expansion. Any variation in the surcharge pressure during the progress of a test has an adverse effect upon the results obtained, and unless the deviation in surcharge pressure is noted and corrected, the values obtained will be in error and therefore unreliable.

One of the objects of the present invention is to overcome the aforementioned difficulty by providing means for automatically maintaining the surcharge pressure at a constant value at all times. This object is attained by providing a reversible electric motor which applies the surcharge pressure to the soil sample through the medium of a lead screw and spring arrangement, and which is actuated by two limit switches mounted on one of the two spring-separated members at one end of the sample. An adjustable screw on the other of the said members is operative to actuate one of the two limit switches when the springs have been compressed by a predetermined amount, so as to stop the motor. If, during the course of the test, the sample should expand longitudinally due to the aforementioned slippage of the grains of soil, causing the surcharge pressure to increase, the other limit switch is actuated by the adjustable screw, causing the motor to operate in reverse until the excess pressure has been relieved and the surcharge pressure has been restored to the predetermined value. Among the advantageous features of the invention is the fact that the surcharge pressure is applied symmetrically to both ends of the sample, instead of to one end only, as in certain prior machines known to applicants.

Another object of the invention is to provide a materials testing machine of the character described, having a novel and improved mechanism for producing shearing deflection of the sample, and for exerting the shearing load force on the sample. In the preferred form of the invention illustrated in the drawings, this shearing deflection and load mechanism embodies a control member in the form of a floating shear box which is supported for free sliding movement in a direction perpendicular to the axis of the sample. Mounted within the shear box is a reversible electric motor, known as the shearing deflection motor, which drives a gear member having a screw-threaded connection with a screw shaft that is attached to the center ring holder of the soil sample. The axis of the screw shaft is disposed parallel to the direction of travel of the shear box, and as the motor-driven gear member turns on the shaft, the latter is moved longitudinally to produce shearing deflection of the center ring of the sample with respect to the outer rings thereof. Such longitudinal movement of the screw shaft causes the shear box to tend to be pulled toward the sample, and this tendency is resisted by the shearing load mechanism which exerts a spring force on the shear box substantially equal and opposite to the force exerted by the screw shaft, so that the shear box is maintained in a substantially fixed position.

The shearing load mechanism includes a heavy load spring which is fastened at one end to the shear box on the side opposite the sample. The other end of the load spring is attached to a spring carriage mounted on a pair of lead screws that are driven by another reversible electric motor, known as the shearing load motor, and when this motor operates in the forward direction, the spring carriage is moved in the direction to stretch the load spring, thereby exerting a shearing load force on the shear box. A pair of oppositely facing, automatic control microswitches mounted on the movable shear box are engageable by limit stops on the stationary structure of the machine as the box moves in one direction or the other, causing one or the other of the two motors to operate automatically in the forward or reverse direction, as the need may be. Thus, if the machine is set up so that the shearing deflection motor runs continuously or intermittently in the forward direction, the movement of the shear box toward the sample responsive to such motor operation causes one of the automatic control microswitches to be actuated, which starts up the shearing load motor, thereby exerting a force on the shear box tending to return the same to its original position.

Another object of the invention is to provide a materials testing machine having automatically controlled means for increasing by predetermined increments either the shearing deflection of the sample or the shearing load applied thereto. This object is realized by the provision of an automatic timer which sends out momentary current impulses at predetermined intervals of time; together with an electrical circuit including relays which are actuated by the aforesaid current impulses to start up and operate either the shear motor or the load motor. These relays are disabled to stop the associated motor when the shearing deflection or shearing load has been increased by a predetermined increment, and this is accomplished by suitable cam means in the mechanism operating microswitches which break the circuit to the coil of the relay involved.

A further object of the invention is to provide a materials testing machine which can be set up to operate under any one of the following four test procedures: (1) shearing load increased by predetermined increments applied at predetermined intervals of time, with the shearing deflection increased by the operation of automatic controls at a rate such that the resistance to deflection balances the load; (2) shearing deflection increased by increments, with the shearing load increased by the operation of automatic controls to balance the resistance of the sample to deflection; (3) shearing load increased continuously and at a substantially uniform rate, with the shearing deflection increased by the operation of automatic controls; and (4) shearing deflection increased continuously and at a substantially uniform rate, with the shearing load increased by the operation of automatic controls to balance the resistance of the sample to deflection. It will be seen that in the first and third cases, shearing load is imposed as an independent variable, and deflection follows as a dependent variable; while in the second and fourth, deflection is the independent variable, and load is the dependent variable. The advantage of being able to run a test by any one of the procedures enumerated above is that it enables the engineer to select the type of test indicated for the particular type of loading conditions anticipated in the soil under consideration. Another advantage is that the results obtained by one test procedure can be compared with those obtained by the other procedures, and with other test data compiled by other investigators using any one or more of these methods, so that the ultimate findings will represent reasonable conclusions based upon a comprehensive collection of data derived from many sources and obtained by many different testing techniques.

Still another object of the present invention is the provision of a novel and improved recorder mechanism for accurately recording the surcharge vs. shearing load and deflection vs. load relationships obtained in the sample during the progress of the test. In its preferred form, the recorder mechanism of the present invention comprises two longitudinally spaced units which extend across the top of the machine transverse to the direction of travel of the load spring carriage. Each of these units consists of an endless bronze tape trained around two pulleys, and mounted on the tape are three stylus carriers. The two recorder units are disposed directly above a sheet of coordinate paper attached to a data board mounted on the spring carriage, and these units are tilted about their longitudinal axes so that the lower straight edge of each unit is spaced closely adjacent to the surface of the coordinate paper. As the stylus carriers travel along this lower edge of the unit, the spring-retracted stylus pins associated therewith are engaged and pressed downwardly at predetermined time intervals by a vertically movable, solenoid-actuated striker bar, causing the pins to make dots on the sheet of coordinate paper. The pulleys of the recorder units are shaft-driven from the power transmission systems driving the surcharge lead screws and the shearing deflection screw shaft, respectively; hence the position of each dot formed by the stylus pins is a function of the distance traveled by the spring carriage, and the amount by which either the screw shaft or the surcharge lead screw has advanced from its initial position. The distance traveled by the spring carriage gives the tension of the shearing load spring, while the advance of the screw shaft and surcharge lead screw denote the shearing deflection and surcharge pressure, respectively. The time factor in the test is also represented graphically by the spacing between dots, inasmuch as the dots are made at predetermined time intervals.

The foregoing and other objects and advantages of the invention will become apparent to those skilled in the art upon consideration of the following detailed description of the preferred embodiment thereof, reference being had to the accompanying drawings, wherein:

Figure 1 is a top plan view of a machine embodying the principles of the invention, the cover plate of the machine being removed to expose the internal mechanism thereof;

Figure 2 is a partially sectioned side elevational view of the machine, taken along the line 2—2 of Figure 1;

Figure 3 is an enlarged longitudinal vertical section, taken along the plane 3—3 in Figure 1;

Figure 4 is a sectional view of a detail, taken at 4—4 in Figure 3;

Figure 5 is an enlarged sectional view, taken at 5—5 in Figure 3, showing the surcharge mechanism in front elevation;

Figure 6 is a transverse section through the surcharge mechanism at 6—6 in Figure 3;

Figure 7 is an enlarged sectional view, taken at 7—7 in Figure 6, showing the internal mechanism of the limit switch box;

Figure 11 is another vertical section, looking in the other direction from 11—11 in Figure 1;

Figure 12 is an enlarged sectional view, taken at 12—12 in Figure 1;

Figure 13 is a section taken at 13—13 in Figure 12, showing the inked ribbon drive mechanism in one of its two operating positions;

Figure 14 is a view similar to Figure 13, but showing the mechanism in the other position;

Figure 8:
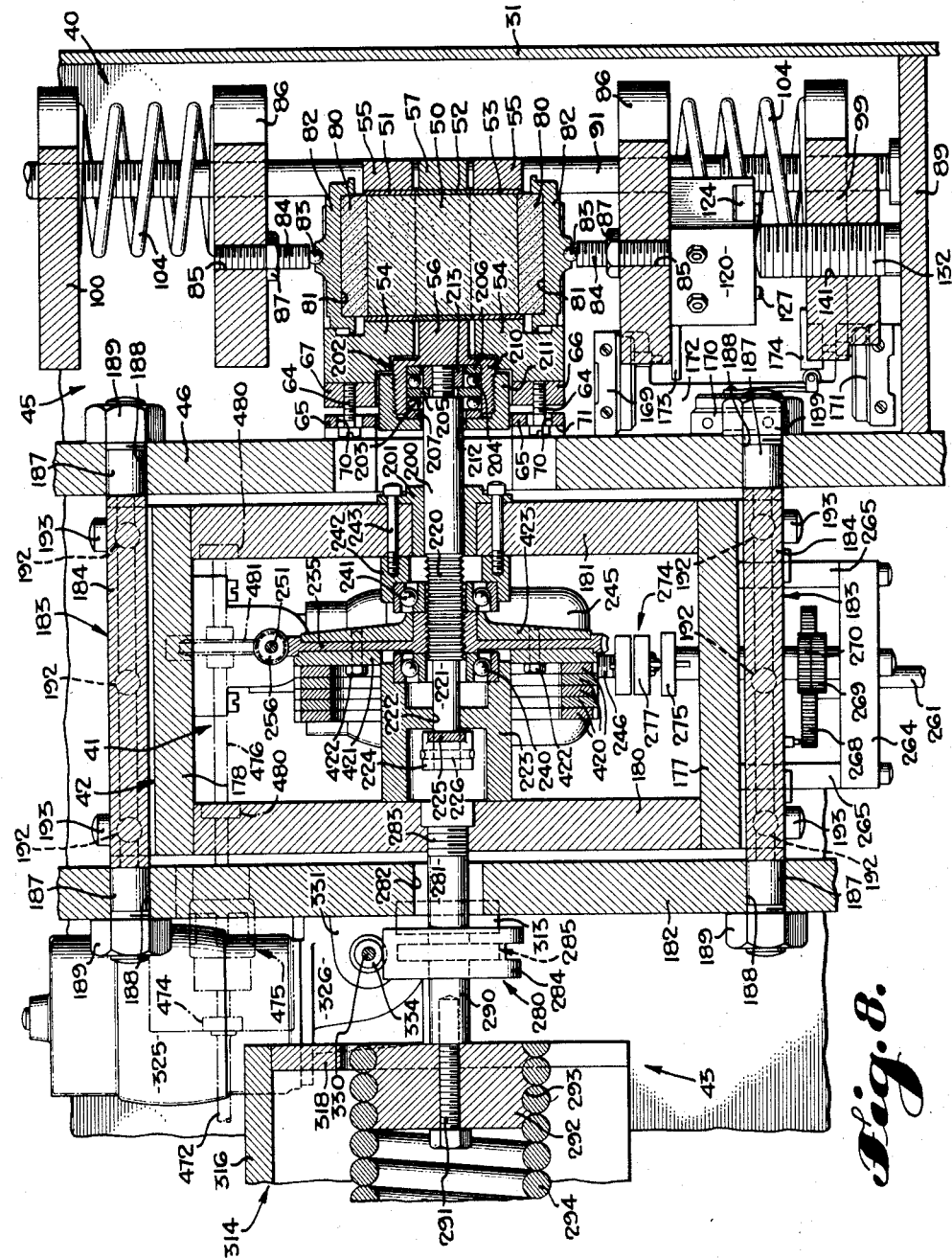
Figure 8 is a horizontal sectional view through the machine, taken along the plane 8—8 in Figure 3.

In the drawings, the machine will be seen to comprise a housing 25 which encloses the operating mechanism, and which is supported on a stand 26 formed of horizontal channel beams 27 that are bolted or otherwise secured to the top end of four legs 28 located at the corners of the machine. The housing 25 consists of a horizontal bottom plate 29 resting on and secured to the channels 27 of the supporting frame, together with end plates 30 and 31, front plate 32, back plate 33 and top plate 34. The bottom plate 29 and left-hand end plate 30 are preferably made of metal, but the top plate 34, right hand end plate 31, and front and back plates 32, 33 may be made of transparent plastic, if desired, so that the mechanism inside the machine can be observed during the performance of a test.

The mechanism contained within the housing 25 may be grouped into four primary units: the surcharge mechanism 40 which has the function of applying a surcharge, or end pressure on the sample; the shearing deflection mechanism 41, which is contained within a floating shear box 42 and produces a lateral displacement of the center section of the three-segment sample, perpendicular to the axis of the sample; the shearing load mechanism 43, which functions to apply a load on the floating shear box 42 balancing the resistance of the sample to shearing deflection; and the recorder unit 44, which records the shearing deflection vs. load and surcharge vs. load relationships obtained in the sample during the performance of the test.

The surcharge mechanism 40 will be taken up first, and is seen to occupy a chamber 45 at the right hand end of the housing 25, between the end wall 31 and a vertical, heavy steel plate partition 46 extending from the front wall of the machine to the rear wall thereof. Entrance to the chamber 45 for the purpose of inserting a soil sample into the holders of the machine is provided by a removable panel 47 in the end wall 31, said panel engaging and closing a microswitch 48 which is serially connected into the electrical circuit of the machine so that the mechanism cannot be operated unless the panel is in place. The microswitch 48 is mounted on a bracket 49, and the latter is secured to the partition 46 near the top edge thereof.

The soil sample, designated by the reference numeral 50, is cylindrical in shape and is tightly confined within three adjoining ring segments 51, 52 and 53 which are separable from one another. The outer rings 51 and 53 are clamped between stationary holders 54 and cooperating caps 55, while the center ring 52 is clamped between a movable holder 56 and its cap 57. Each of the caps 55 and 57 is secured to its respective holders by means of two stud bolts 60 which project from the face of the holder on opposite sides of the rings. The caps are drilled to receive the studs 60 and are provided with quick-detachable locks in the form of swing clips 61 which are pivotally connected to the cap for swinging movement between the locked position, shown in Figure 3, and an unlocked position at 90° thereto.

To effect the locking action, the swing clips 61 are provided with pivot shafts 62 which are journaled in bores within the caps, said bores intersecting the edges of the drilled passageways that receive the studs 60. At the point of intersection with the passageway, each of the shafts 62 is cut out to provide clearance for the stud 60 when the swing clip 61 is swung out to the unlocked position. When the clip is in the locked position, the pivot shaft 62 seats in a semi-cylindrical recess formed in the side of stud 60, as shown in Figure 3, thereby preventing the cap from being withdrawn from the stud. This arrangement enables the three caps to be secured quickly to their holders when the sample is placed in the machine, and to be removed quickly when the test has been completed.

The two outer holders 54 are supported on the partition 46 and are secured thereto by two bolts 64 (Figure 8) cooperating with a back plate 65 and two laterally spaced front plates 66 and 67. Back plate 65 is bolted or otherwise suitably secured to partition 46, while the two front plates 66 and 67 are attached by screws 68 (Figure 4) to the back sides of the two outer holders 54. Bolts 64 pass through horizontally elongated slots 70 in plate 65, and are threaded into tapped holes in the plates 66, 67; the back side of the plate 65 being recessed at 71 (Figure 8) to provide clearance for the heads of bolts 64.

A limited amount of free lateral movement of the outer holders 54 parallel to the axis of the soil sample is provided for by ball bearings 72 which are confined between two pairs of straight, horizontally extending, closed-end races 73 and 74 (Figure 4) formed in adjacent faces of the back plate 65 and front plates 66, 67. The bolts 64 are drawn up only sufficiently tight to prevent undue separation of the front plates 66, 67 from back plate 65, which would permit the ball bearings 72 to escape from their races. As tension is applied to the center holder 56, the two outer holders 54 are pulled toward the partition 46, causing the races in the plates 66, 67 to bear tightly against the ball bearings 72. The slight movement of plates 66, 67 to the left (Figure 8) causes the heads of the bolts 64 to move away from the plate 65, so that the plates 66, 67 with their attached holders are free to roll on the ball bearings 72 within the limits of the slots 70. This arrangement permits the two outer holders 54 to move apart from the center holder 56 if the sample should expand during the shearing deflection of the test, and friction of the soil against the outer rings 51, 53 is too great to allow the soil to slide freely within the rings.

The surcharge pressure is applied to the ends of the soil sample 50 by means of two porous stone disks 80 which are slightly smaller in diameter than the inside dimension of the rings 51, 53 so as to be freely slidable therein. The stone disks 80 are seated within recesses 81 in end plates 82, and the latter are provided on their outer faces with raised central bosses having sockets formed therein, into which bearing balls 83 are pressed. The bearing balls 83 are engaged by the projecting ends of threaded studs 84 which are screwed into tapped holes 85 in spring plates 86. Each of the studs 84 has a conical socket formed in the outer end thereof, into which the ball 83 seats. This flexible ball joint between the stud 84 and end plate 82 provides a universal connection therebetween, enabling the stone disks 80 to accommodate themselves to any unsymmetrical consolidation of the sample. Lock nuts 87 secure the studs 84 in adjusted position.

Both of the spring plates 86 are slidably mounted on two vertically spaced, horizontally extending lead screws 90 and 91, the ends of which are journalled in bearings 92 and 93 mounted on a partition 89 and end wall 33, respectively. The center portions of the lead screws 90, 91 are smooth-surfaced, and the spring plates 86 are provided with bearing holes 94 and 95 which slidably receive the shafts. Each of the lead screws 90, 91 is provided at one end with a right-hand thread 96, and at the other end with a left-hand thread 97, and mounted on these threaded portions are screw plates 99 and 100. It will be noted in Figures 5 and 6 that the bottom lead screw 91 has the right-hand thread 96 and the left-hand thread 97 at the right and left ends thereof, respectively, while the top lead screw 90 has the order of the threads reversed. Thus, the thread 96 at the left end of lead screw 90 is opposite to the corresponding thread 97 at the left end of lead screw 91, and the same relationship exists at the right end of the two lead screws.

The two screw plates 99, 100 are disposed parallel to their respective spring plates 86, and are provided with threaded holes 101 and 102 that receive the threaded portions of the shaft. Each of the screw plates 99, 100 is operatively connected to its associated spring plate 86 by two compression coil springs 103 and 104, which encircle the lead screws 90, 91, respectively. The ends of the springs 103, 104 are ground off flat, perpendicular to the axes of the spring coils, and are seated within annular channels 105 formed in the adjacent faces of the spring plates 86 and screw plates 99, 100.

The two lead screws 90, 91 are driven in opposite directions to advance the screw plates 99, 100 inwardly toward their respective spring plates 86, thereby compressing the springs 103, 104. It is this pressure of the compressed springs acting against the spring plates 86 that is applied to the sample 50 as the surcharge, and the amount of pressure exerted thereon depends upon the amount of deflection of the springs. The lead screws 90, 91 are driven by a reversible electric motor 106 which operates through a speed reduction and right-angle-drive gear box 110 to turn a vertically disposed drive shaft 111 that is journalled adjacent its ends in bearings 112 mounted on the back wall 33. As will be noted in Figures 1 and 3, the lead screws 90 and 91 are offset laterally with respect to one another, and the drive shaft 111 extends upwardly between them, passing to the left of lead screw 91 and to the right of lead screw 90 (Figure 3). Fixed to shaft 111 in the horizontal planes of the lead screws 90 and 91 are worm gears 113 and 114 which mesh with gears 115 and 116, respectively, on lead screws 90 and 91. The teeth of both worms 113 and 114 lead in the same direction, and lead screws 90 and 91 are therefore driven in opposite directions at greatly reduced speed from the drive shaft 111.

The surcharge pressure on the soil sample is controlled automatically by means of a limit switch box 120 mounted on the back of the left-hand spring plate 86 (Figures 6 and 7), and contained within this box are two microswitches 121 and 122 which control the forward and reverse circuits of the motor 106. Switch 121 is normally closed, and is connected through one pole of a two-pole impulse relay 117 (see electrical circuit diagram in Fig. 21) to the coil of a relay 118 which controls the forward drive circuit of the surcharge motor 106. When switch 121, is opened, relay 118 is disabled, breaking the forward drive circuit to the motor 106 and causing the latter to stop. Switch 122 is normally open, and is connected to another relay 119 which controls the reverse drive circuit of the motor 106. When switch 122 is closed, the relay 119 is energized, closing the reverse drive circuit of the motor 106 and causing the latter to start up in reverse.

The open outer end of the box 120 is closed by a cover plate 123 having inwardly directed end portions 124 which terminate in knife edges 125. The cover plate 123 is disposed between the side walls of the box 120, and the knife edges 125 bear on the recessed outer edges of the end walls 126 of the box. Bolts 127 which secure the box to the face of the spring plate 86 pass through enlarged holes 130 in the end portions 124 of the cover plate, and disposed between the heads of the bolts and the outer surface of the cover plate are soft rubber washers 131. The combination of the knife edge supports 125, clearances provided for bolt 127 by the enlarged holes 130, and the resilient washers 131 between the cover plate and the heads of the bolts permits the end portions 124 of the cover plate to rock slightly, thereby enabling the center portion of the cover plate 123 to bow inwardly under the pressure of an adjusting screw 132. Intermediate its ends, the cover plate 123 is cut away leaving a relatively thin center portion 133 which deflects as a beam under the pressure of the screw 132. The end of the screw 132 is rounded off to obtain a substantially point contact with the cover plate 123 at the midpoint of the latter.

Formed integrally with one end portion 124 of the cover plate are two laterally spaced fingers 134 and 135 extending lengthwise of the cover, the free ends of said fingers being adapted to engage the operating plungers 136 of the microswitches 121 and 122. The clearances between the ends of fingers 134, 135 and their respective operating plungers 136 are regulated by means of two adjusting screws 140 which are threaded into holes in the cover plate adjacent the attached ends of the fingers, said screws engaging the fingers to bend the same inwardly toward the microswitch plungers. Finger 135 is offset, or bent outwardly, as shown to an exaggerated degree in Figure 7, so that its plunger 136 is not engaged until after the other plunger has been engaged by spring finger 134, the reason for which will presently be explained.

The spring fingers 134 and 135, being attached to the rockable end portion 124, and being further backed up by the adjusting screws 140, tend to swing inwardly at their free ends when the cover plate is bowed in by the pressure of screw 132. Due to the offset in finger 135, the operating plunger of microswitch 121 is engaged and depressed first by finger 134, opening relay 118 and bringing the motor 106 to a stop. Further inward deflection of the cover plate due, for example, to endwise expansion of the sample, causes the operating plunger of microswitch 122 to be depressed by finger 135, thereby actuating relay 119 and starting motor 106 in reverse. Such reverse operation of the motor continues only until the plunger of microswitch 122 is released by finger 135, at which point, the motor stops while the plunger of microswitch 121 is still depressed by finger 134.

The adjusting screw 132 is screw-threaded through a tapped hole 141 in the left hand screw plate 99 (Figure 6) and passes freely through holes 142 and 143 in walls 89 and 32, respectively. A knurled surcharge adjustment knob 144 is fixed to the outer end of the adjusting screw 132, which enables the operator to turn the screw so as to advance the same through the screw plate 99. The smooth-surfaced portion of the screw 132 passes through the hub 145 of a gear 146 and is keyed or splined to said hub for non-rotative sliding movement relative thereto. Gear 146 meshes with one of two trains of gears, designated collectively by the reference numeral 150, which are organized and arranged to drive dials 151, 152, 153 and 154, as well as rotatable index rings 155 and 156 which surround dials 153 and 154, respectively. Dial 151 gives the surcharge pressure in thousands of pounds, ranging from zero to 16,000, while dial 152 gives divisions of the surcharge pressure in hundreds of pounds, ranging from zero to 1,000. Dial 153 gives the length of the sample in inches and tenths of an inch, ranging from 2.6 to 3.6 inches, while dial 154 gives divisions of the length of the sample in thousandths of an inch, ranging from zero to .100. The gears 150 are disposed between and supported on two spaced, parallel plates 160 and 161 which are mounted on the partition member 89 in the space between the latter and the front wall 32 of the housing. Meshing with the other train of gears in the gear assembly 150 is a small pinion 162 fixed to the end of the lower lead screw 91, which drives the dials 153 and 154.

As best shown in Figure 6, the two dials 153, 154 are set into circular cavities formed in the outer surfaces of disks 163 and 164, and the faces of the dials are flush with the exposed outer surfaces of the annular rims of their respective disks. These exposed rims of the disks 163, 164 constitute the index rings 155, 156 mentioned earlier, and suitable index marks are provided thereon which cooperate with the markings of the dials to give the instrument readings. The disks 163, 164 are mounted on tubular shafts 165 and 166, respectively, which are operatively connected with the first-mentioned train of gears in the assembly 150, and are rotated by the surcharge adjustment knob 144 when the latter is turned. The dials 153, 154 are mounted on shafts 167 and 168, respectively, which pass through the centers of tubular shafts 165, 166, and are operatively connected with the last-mentioned train of gears in the assembly 150, so that the said dials are driven by the lead screw 91. Thus, when the surcharge adjustment knob 144 is turned, two functions are performed: first, the screw 132 is advanced through the screw plate 99 so that its inner end is positioned to engage the cover plate of the limit switch box 120 and actuate the microswitches contained therein when the springs 103 and 104 have been compressed to a predetermined deflection; and second, the dials 151, 152 are turned to show the surcharge pressure which will be exerted on the sample when the surcharge mechanism 40 comes to rest, while simultaneously, the index rings 155, 156 are turned to positions which will indicate on their respective dials 153, 154 the actual length of the sample under the surcharge pressure obtained when the surcharge mechanism comes to a stop for the first time.

The cooperative relationship between the adjustment screw 132 and the surcharge pressure dials 151, 152 is based upon the well-known fact that the deflection of a spring is directly proportional to the force exerted thereon. Since they are geared directly to screw shaft 132, dials 151, 152 actually give a reading based upon the number of turns made by the screw shaft in screw plate 99, which, in turn, determines the distance from the plate 99 to the end of the screw shaft 132. The farther the screw shaft projects beyond the screw plate 99, the less clearance there will be between the end of the screw shaft and the cover plate 123 of the limit switch box, and the less deflection there will be in the springs 103, 104 when the shear mechanism comes to a stop. Thus, the surcharge pressure, which is a function of the spring deflection, depends upon the position of the end of screw shaft 132 with respect to the cover plate 123 when the springs 103, 104 are unstressed, and the dials 151, 152 are merely calibrated to show the spring pressure that will be obtained for any given position of the screw shaft.

As mentioned earlier, the dials 153, 154 are geared to the lead screw 91 which, together with lead screw 90, causes the screw plates 99, 100 to move together or apart, depending upon the direction of rotation. The position of the dials is, therefore, directly related at all times to the distance between the two screw plates. In measuring the length of the sample from the distance between the screw plates, it is necessary, of course, to take into account the amount of deflection of the springs 103, 104. This is done by gearing the index rings 155, 156 to the surcharge adjustment knob so that the position of the index rings is directly related to the spring deflection, or surcharge pressure. Thus, the readings obtained from the positions of the reference points on index rings 155, 156 with respect to the calibrations on dials 153, 154 represent the distance between the screw plates 99, 100, from which has been subtracted the variable distance between each of the screw plates and its associated spring plate 86, with suitable allowance being made for the constant distance between each of the spring plates and the outer face of its corresponding stone disk 80.

The spring plates 86 and screw plates 99, 100 are prevented from over-traveling their normal limits by means of three microswitches 169, 170 and 171 that are mounted on a supporting bracket shelf 172 which is fixed to the partition member 46. Microswitch 169 is normally open, and is operatively connected to the coil of the impulse relay 117 which energizes one or the other of relays 118 and 119 controlling the forward and reverse circuits, respectively, of the surcharge motor 106. When microswitch 169 is open, relay 117 is normally operative to transmit current from one of its poles to the coil of relay 118, thereby energizing the latter. This completes the forward drive circuit to the motor 106 and causes the latter to run in the forward direction. If the left hand spring plate 86 over-travels its limiting position, the operating plunger of microswitch 169 is engaged and depressed by a bar 173 fixed to the spring plate, which closes the switch and energizes relay 117. This has the effect of opening the circuit to relay 118 and closing the circuit to relay 119, which causes the motor 106 to stop running in the forward direction and start up in reverse, so that the spring plate 86 is backed away from its past-limit position.

Both of the microswitches 170 and 171 are normally closed, and function to limit the reverse travel of the screw plate 99. These switches are connected together in series, and are operatively connected to relay 119 controlling the reverse drive circuit to motor 106. If either switch is opened, relay 119 is disabled, causing the motor to stop running in reverse. Switch 170 has a roller carried at the end of an actuating lever arm, and when the said roller is engaged and lifted by a block 174 on the screw plate 99, as shown in Figure 8, the contacts in the switch are opened. Switch 171 has an operating plunger that is engaged directly by the block 174 when the screw plate 99 has traveled a short distance beyond the point at which switch 170 was actuated.

With the machine operating under its automatic controls, the motor 106 is stopped when switch 170 is actuated. However, there are occasions when it may be necessary to back the screw plate 99 still further, and to this end, a manually controlled reverse switch 175R (see Figure 21) is connected into the line between switch 171 and switch 170, so that the motor 106 can be run in reverse even though the switch 170 is open. With the opening of switch 171, the reverse circuit of the motor 106 is finally broken completely, and cannot be restored until the screw plates 99, 100 have been run forwardly to disengage one or both of the limit switches 170, 171.

The shear mechanism 41, as mentioned earlier, is contained within a floating shear box 42 which is seen to comprise a bottom panel 176, side walls 177 and 178, top panel 179, and end walls 180 and 181. The shear box is disposed between vertical partition members 46 and 182, the latter being parallel to and spaced to the left of member 46 and extending from the front wall 32 of the housing to the rear wall 33 thereof. Floating support for translational movement of the shear box 42 is provided by two ball bearing mounts 183 at opposite sides thereof, each of said mounts comprising a horizontally extending center bar 184 of generally rectangular cross-section disposed between parallel upper and lower bars 185 and 186, respectively. The ends of the center bar 184 are machined down to form cylindrical studs 187 which pass through holes 188 in the members 46 and 182, and which are threaded to receive nuts 189. Formed in the top and bottom edges of the center bar 184 are races 190 that cooperate with races 191 in the top and bottom members 185, 186 to receive ball bearings 192. The top and bottom members 185, 186 of the mount are secured by screws 193 to the side walls 177 and 178, of the shear box 42 so that the latter is thus supported on the ball bearings 192 and rolls freely thereon along the length of the races 190, 191. The maximum movement of the shear box is limited, of course, to the sum of the clearances between the ends of the box and the partition members 46, 182; although the actual movement of the box during the performance of a test is usually only a small fraction of an inch.

Shearing of the soil sample 50 is performed by a screw shaft 200 which extends through and is slidable within a bushing 201 mounted on the end wall 181 of the shear box 42. The projecting outer end of the screw shaft 200 is connected to the center holder 56 by a swivel connection 202 which transmits the pull to the holder without torsion. The swivel connection 202 is essentially a double row thrust bearing consisting of two rows of ball bearings 203 and 204 which are confined between flat races 205, 206, and 207. The balls and races are contained within a cup-shaped socket 210 formed on the back side of the center holder 56; said socket having external threads to receive a cap 211 which is apertured centrally at 212. The screw shaft 200 projects through the aperture 212 and has a threaded stud of reduced diameter formed on its end, which receives a nut 213. The center race 205 is clamped between the nut 213 and a shoulder formed at the junction of the stud with the main body of the shaft 200.

On the inside of the shear box 42, the shaft 200 is threaded at 220, and beyond this threaded portion is reduced slightly in diameter to form a spindle portion 221. This spindle portion 221 extends through a hole 222 in a bearing support member 223 that is mounted on the back end of wall 180 of the shear box 42, and the projecting extremity of the spindle portion is received within an apertured boss 224 formed at the bottom end of a vertically disposed outrigger 225. The spindle 221 is non-rotatably secured to the boss 224 by a pin 226. The upper end of the outrigger 225 projects through a slot 30 in the top panel 179 of the shear box, and terminates in a threaded stem 231 which passes through a slide 232 and is secured thereto by nuts 233. The slot 230 extends parallel to the axis of the shaft 200, and the slide 232 moves freely therein as the outrigger is carried with the shaft. The outrigger 225 thus prevents the shaft 200 from turning, while at the same time permitting the shaft to move axially.

Mounted on the screw-threaded portion 220 of the shaft is a worm gear wheel 235 having a hub 236 which is threaded internally to cooperate with the threads 220. The hub 236 of the gear wheel is engaged at one end by the inner race of an angular contact ball bearing 240, and at the other end by the inner race of another angular contact ball bearing 241. The two ball bearings 240 and 241 are of the type designed to take both thrusts and radial loads, and the gear wheel 235 is thus constrained against axial movement with respect to the shear box 42, while at the same time being free to rotate so as to pull the screw shaft 200 in one direction or the other. The outer race of the ball bearing 241 is mounted in a bearing support ring 242 which is secured to the end wall 181 of the shear box by screws 243 that serve also to fasten the bushing 201 in place. The outer race of the other ball bearing 240 is likewise mounted in the bearing support member 223 which is secured to the rear end wall 180 of the shear box by screws 244 (Figure 3).

The gear wheel 235 is driven by a reversible electric motor 245, hereinafter referred to as the "shear motor," which is mounted on the shear box bottom panel 176 of the shear box. The motor 245 is preferably of the type having a built-in governor control which is adapted to be regulated by turning a shaft 246 projecting from one end of the housing thereof. Mounted on the other end of the motor housing is a speed reduction and right-angle-drive gear housing 250 which transmits the power of the motor to a vertical drive shaft 251 that is rotatably supported at its ends in ball bearings 252 and 253. The output shaft 254 of the gear box 250 is disconnectably coupled to the bottom end of the drive shaft 251 by a coupling member 255, so that the motor 245 can be removed from the shear box for servicing, if necessary, without disturbing the drive shaft 251. Mounted on the drive shaft 251 is a worm 256 which meshes with the gear 235 to drive the latter.

Shear motor 245, as mentioned earlier, has a built-in governor control which is regulated by a rotatable shaft 246 projecting from the back end of the motor housing. Regulation of the speed of the motor from the outside of the machine is accomplished by means of a governor control knob 260 which is mounted on the outer end of a shaft 261 extending through an oversize hole 262 in wall 32 of the housing. The shaft 261 extends through and is both slidable and rotatable within a hole 263 in a plate 264. Plate 264 is supported parallel to wall 177 of the shear box and spaced outwardly therefrom on two laterally spaced blocks 265. The inner end of shaft 261 extends part way into a socket hole 266 in wall 177, and is engaged by a compression spring 267 which urges the shaft outwardly.

Fixedly mounted on the shaft 261 between plate 264 and wall 177 is a gear 268 which is adapted to be meshed selectively with either of two coaxial pinions 269 and 270. Pinion 269 is non-rotatably mounted on a bolt 271 which passes through a hole in plate 264, and to this end is threaded internally to receive the screw-thread on the end of the bolt. Pinion 269 thus serves as a nut on bolt 271, and the latter is drawn up tightly to lock the pinion against rotation. The other pinion 270 is fixedly secured by a pin to a shaft 272 that is journalled in a hole 273 in wall 177. The inner end of shaft 272 is connected to the governor control shaft 246 by a disconnectable coupling 274 which may take any desired form, but is illustratively shown as comprising a flanged member 275 on shaft 272, which is connected by pins 276 to a member 277 that is threaded on shaft 246. The pins 276 are slidable within the holes in flanged member 275 to facilitate the removal of motor 245 from the shear box 42, and to permit axial movement of the member 277 with respect to member 275.

Figure 9:
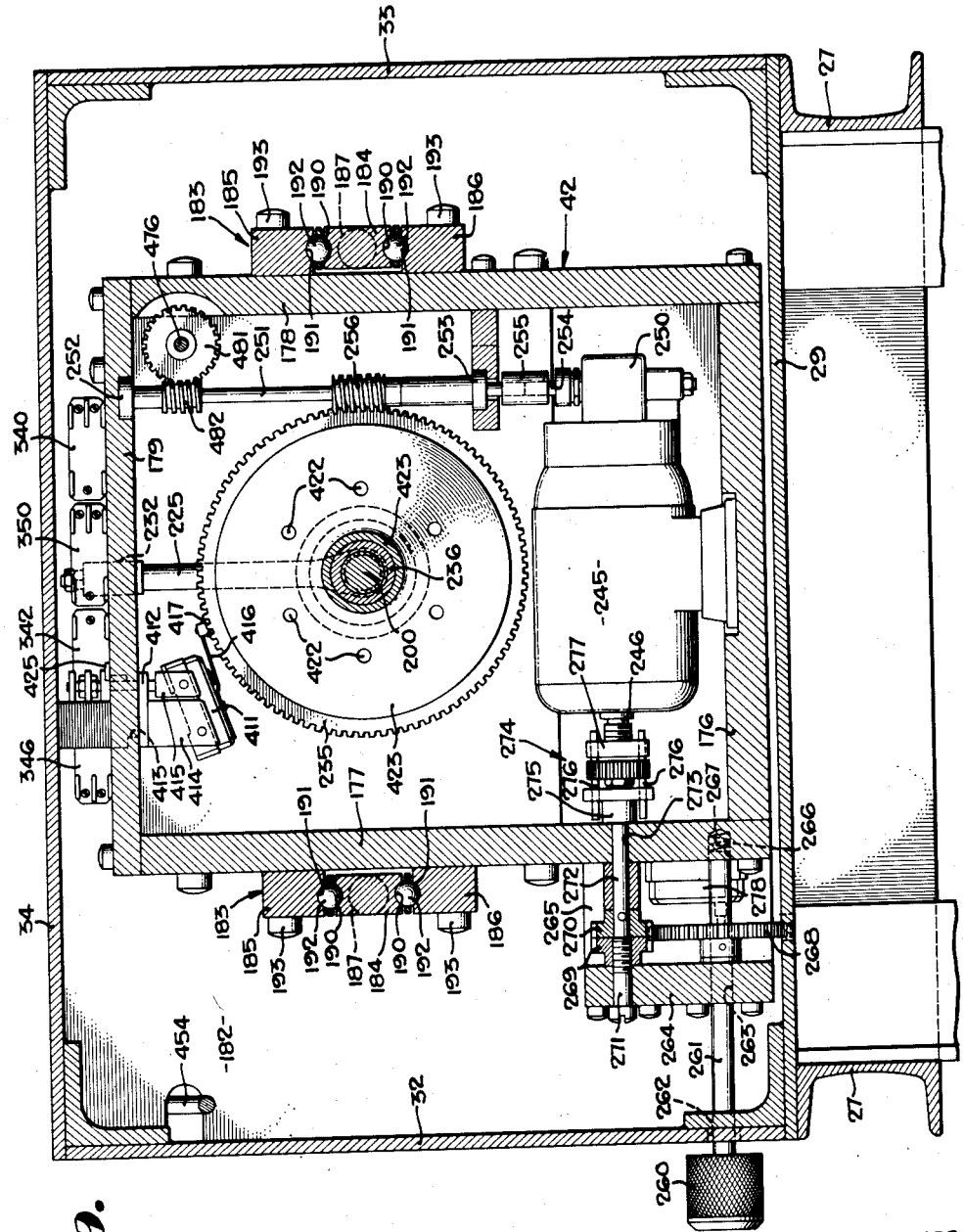
Figure 9 is a vertical section through the shear box, taken at 9—9 in Figure 3.

Normally, gear 268 is held by spring 267 in the position shown in Figure 9, with its teeth meshed partly with pinion 269 and partly with pinion 270. Since pinion 269 is non-rotatable, this engagement of gear 268 with both of the pinions 269, 270, causes the latter pinion to be locked against rotation, thereby locking the governor control shaft 246 in adjusted position. To change the speed of motor 245, control knob 260 is pressed inwardly against the pressure of spring 267, which shifts gear 268 out of mesh with stationary pinion 269 and into full mesh with pinion 270. Knob 260 and gear 268 can then be turned to rotate pinion 270 and drive the governor control shaft 246 to a new position of adjustment giving a different motor speed. When the desired adjustment has been obtained, the pressure on control knob 260 is released, permitting spring 267 to shift gear 268 back into partial mesh with stationary pinion 269 and thereby lock the train of gears against further rotation.

Mounted on the side wall 177 of the shear box 42 beneath the plate 264 is a normally closed microswitch 278, the operating plunger of which is engaged and pressed inwardly by the rim of gear 268 when the latter is shifted to the right (Figure 9). Microswitch 278 is connected in series with each of two normally open, automatic control microswitches 342 and 356 which are mounted on top of the shear box 42, and are actuated when the box moves toward the left or right, respectively, from its centered position. The microswitches 342 and 356 are connected into the electrical circuit of the machine, as described more fully hereinafter, so that when the shear box is moved in one direction as a result of the operation of either the shear motor 245 or a load motor 325, the other motor is started up in a direction to cause a balancing force to be applied to the shear box tending to restore the same to its initial position. It will be sufficient, at this point, to state that the microswitches 342 and 356 are connected to a three pole, double-throw selector toggle switch 279 (Figure 20) on the control panel 336. When switch 279 is thrown over to position "A," microswitch 342 is connected to a relay 286 (Figure 21) controlling the forward drive circuit of the shear motor 245, and microswitch 356 is connected to a relay 287 controlling the reverse drive circuit of the shear motor. At position "B," switch 279 connects microswitch 342 to a relay 289 controlling the reverse drive circuit of a load motor 325, to be described in more detail presently, and at the same time, microswitch 356 is connected to a relay 288 controlling the forward drive circuit of the load motor.

Microswitch 278 thus functions to disable the two automatic control switches 342 and 356 when the governor adjustment knob 260 is pressed inwardly. The purpose of this arrangement is to prevent the microswitches 342 and 356 from being actuated and starting up either the shear motor 245 or the load motor 325 as a consequence of any movement of the shear box 42 resulting from inadvertent transmission of a horizontal force thereto through the governor-adjusting knob 260.

From the foregoing description, it will be seen that the motor 245, acting through gear box 250, drives shaft 251, and worm 256, drives the gear 235, which causes the screw shaft 200 to be moved axially toward the left. Such movement of the shaft 200 toward the left is, of course, resisted by the soil sample 50, and since the shear box 42 is freely movable on the ball bearing mount 183, the shear box 42 tends to be pulled toward the right. This tendency is resisted by the loading mechanism 43, which will now be described.

The shear box 42 is operatively connected to the loading mechanism 43 by a coupling member 280 having a shank 281 which extends through an enlarged hole 282 in partition member 182. One end of the shank 281 is threaded at 283 and is screwed into the end wall 180 of the shear box. The other end of the coupling member 280 is provided with an enlarged head 284 having a socket formed therein which is open on one side to receive a radially projecting flange 285 on one end of a connecting member 290. Secured to the other end of the connecting member 290 by a bolt 291 (see Figure 8) is a generally cylindrical plug 292 having spiral grooves 293 formed in the outer periphery thereof, which are shaped and arranged so that the coils of a heavy load spring 294 can be screwed onto the same. The outer end coil of the spring is then welded to the plug 292, permanently attaching them together. The quick-disconnect coupling obtained by the member 280, 290 enables the operator to change springs quickly to meet the requirements of a particular sample of soil. Thus, for example, relatively light springs would be used in the machine when testing a weak soil, such as a soft clay; while shale or sandstone would require extremely heavy springs.

The coils of the spring 294 are normally closed tightly together, as shown in the drawings, and the spring is stretched from its other end by means of another connecting member 295 having a plug member 296 secured thereto by a bolt 300 (see Figure 2). The plug member is likewise formed with spiral grooves 301 in its outer peripheral surface, and is screwed into and welded to the coils of the spring 294 in the same manner as plug member 292. The connecting member 295 has a radially projecting flange 302 on the end opposite the plug member 296, and this flange is received within a socket in the head of a coupling member 303. The coupling member 303 is rotatably supported on a screw plate 304 by ball bearings (not shown) which permit the spring 294 to twist or untwist freely and without restraint as the same is stretched or allowed to contract.

The screw plate 304 is disposed perpendicular to the axis of spring 294, and pressed into holes in the top and bottom ends thereof are internally threaded sleeves 305 which receive the threaded end portions 306 of two lead screws 310 and 311. The lead screws 310 and 311 are disposed parallel to one another and to the axis of spring 294, and their ends are rotatably supported by bearings 312 and 313 which are mounted on the end wall 30 and partition 182, respectively.

Attached to the screw plate 304 and movable therewith is a carriage 314 comprising a bottom panel 315, back panel 316, data board 317, and U-shaped end plate 318. Horizontal supporting arms 319 and 319' are attached to the screw plate 304 and end plate 318, respectively, and project laterally therefrom. These arms have lengthwise-extending channels 320 formed in their inwardly facing sides, which receive the side edges of the data board 317 to hold the latter. Adjacent their outer ends, the arms 319 and 319' are connected by a crossbar 321, and mounted on the latter is a spring catch 322 which drops into a recess in the under side of the data board, adjacent the outer edge thereof, to secure the same in place. The lead screws 310 and 311 extend through apertures 323 in the end of the carriage 314, and are both slidable and rotatable therein. The carriage 314 is thus supported on the lead screws 310, 311 at one end by the screw plate 304, and at the other end by the member 319' and end panel 318.

The two lead screws 310 and 311 are driven by a reversible electric motor 325, hereinafter referred to as the "load motor," which is mounted on the back side of partition member 182. Formed integrally with the motor housing is a speed reduction and right-angle-drive gear box 326, the output shaft of which is connected to a vertical drive shaft 330 that is journalled in bearings 331 mounted on the partition member 182. Gears 332 and 333 are fixed to the lead screws 310 and 311, respectively, and meshing with these gears are worms 334 and 335 which are fixed to the drive shaft 330. The motor 325 thus drives the two lead screws 310 and 311 through the gear box 326, vertical drive shaft 330, worms 334 and 335, and gears 332 and 333; and as the lead screws rotate, the screw plate 304 is carried to the left by the threads 306, stretching the spring 294 and thereby applying a tension force to the shear box 42, tending to pull the latter toward the left.

The spring carriage 314 is prevented from overtraveling to the left by two microswitches 336 and 337 mounted side by side on a bracket 338 which is attached to the end wall 30 of the housing; and from overtraveling to the right by two microswitches 344 and 345 mounted side by side on a bracket 339 which is attached to the partition 182. Microswitches 336 and 344 are normally closed limit switches which are connected to the coils of relays 288 and 289, respectively, and act to stop the load motor 325 when the carriage 314 has reached the limit of its travel in either direction. Switches 337 and 345 are normally open load-motor-reversing switches which are actuated almost immediately after their respective limit switches have been opened, and are connected to the coils of relays 289 and 288, respectively.

As the carriage 314 reaches the left-hand limit of its travel due to forward operation of the load motor 325, the operating plunger of microswitch 336 is contacted by the arm 319, disabling relay 288 and breaking the forward drive circuit to the load motor. Almost instantaneously after this has happened, the plunger of microswitch 337 is depressed by the arm 319, energizing relay 289 and closing the reverse drive circuit to the load motor. The reverse torque of the motor exerts a powerful braking action on the armature which is still running forwardly from its own momentum, and brings the same to a sudden stop; whereupon the armature starts up in reverse to back the carriage 314 away from end wall 30 until microswitch 337 is reopened.

In like manner, when the carriage 314 reaches the right-hand limit of its travel due to the reverse operation of the load motor 325, the plunger of microswitch 344 is contacted by the arm 319', disabling relay 289 and breaking the reverse drive circuit to the load motor. A few thousandths of an inch further travel of the carriage 314 causes switch 345 to be closed, energizing relay 288 and closing the forward drive circuit to the load motor 325, so that the reversing torque of the motor brakes the armature to a stop and then causes the carriage to back off slightly to reopen switch 345. The arrangement described above enables the carriage to be stopped very quickly, and eliminates the need for special braking equipment.

Figure 20:
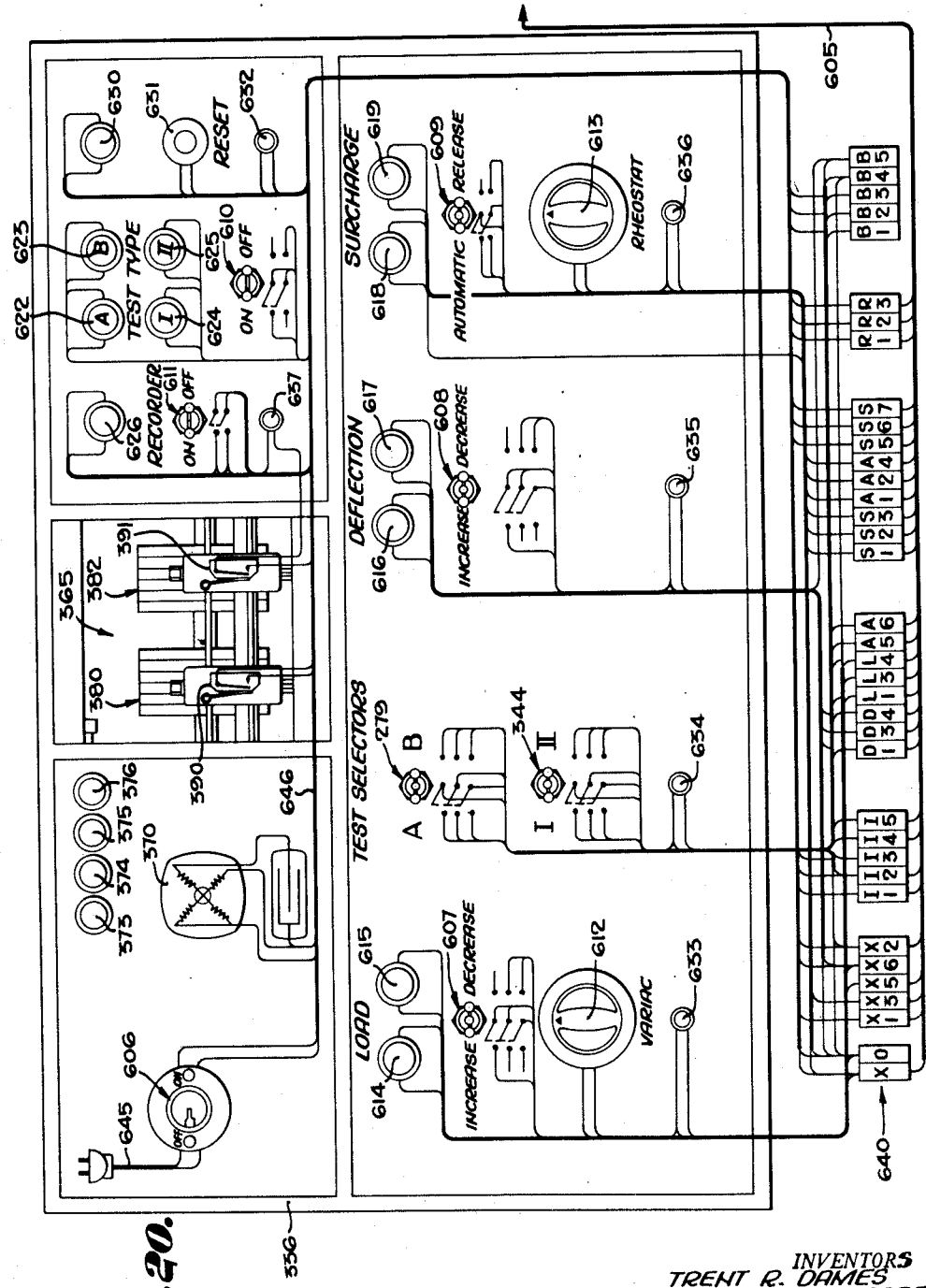
Figure 20 is a front elevational view of the control panel for the machine, with a schematic representation of the associated electrical circuit superimposed thereon.
Figure 21:
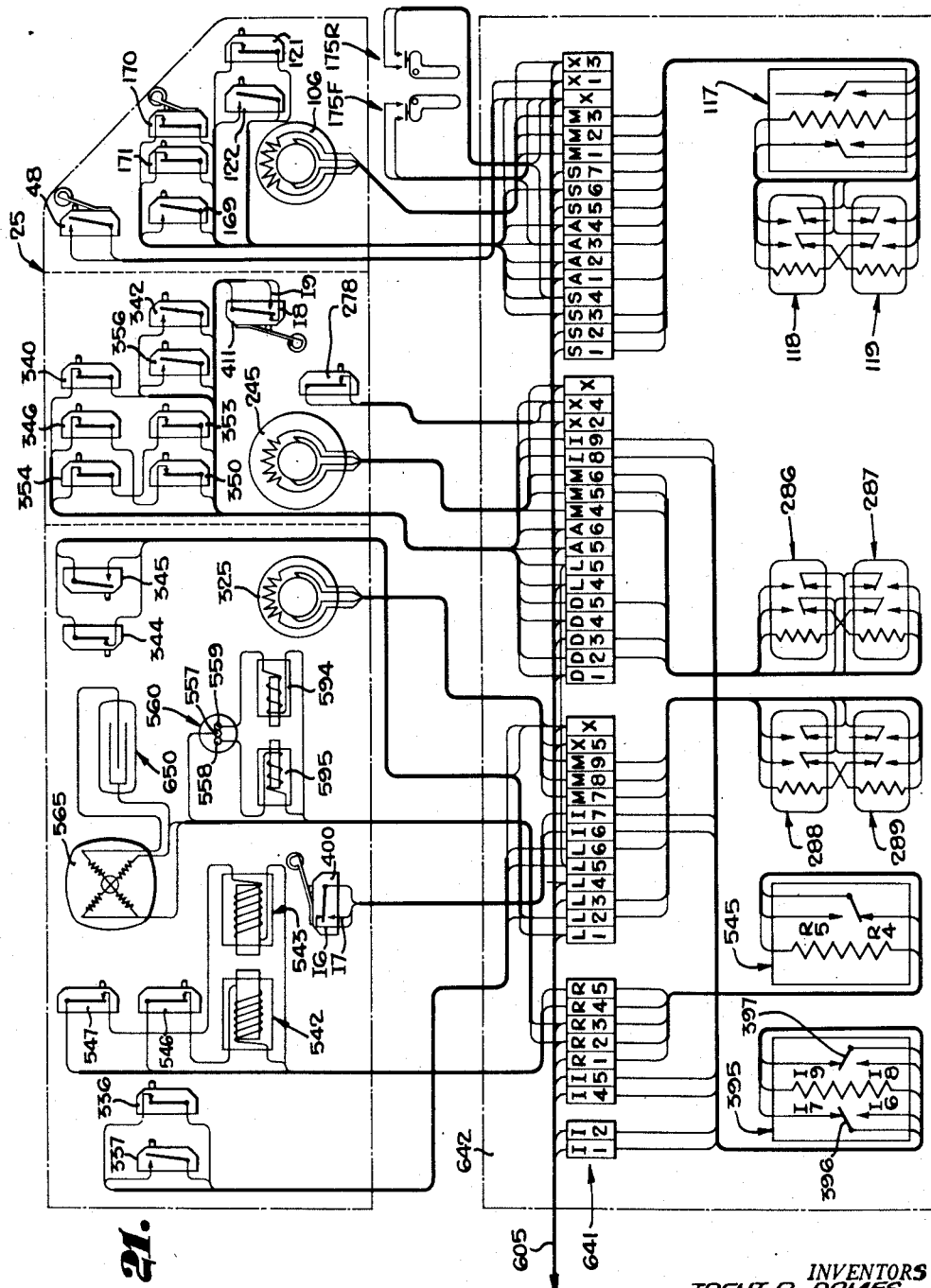
Figure 21 is a schematic diagram of the circuit in the machine itself.

The shear motor 245 and load motor 325 are automatically set into operation, according to the setting of certain switches on the control panel 336, by means of the two automatic control microswitches 342 and 356 mounted on top of the shear box 42, the relative positions of which are shown in Figure 1, and their electrical circuits being illustrated in Figures 20 and 21.

Microswitch 342, as mentioned earlier, is adapted to be operatively connected to either of two relays 286 and 289, depending on whether selector switch 279 is at the "A" or "B" position. Switch 342 is normally open, and is closed when its operating plunger is engaged by an adjustable limit stop 343 on the partition 182 as the shear box 42 moves toward the left. When the selector switch 279 is at the "A" position, the shear motor 245 is on automatic controls, and the shear box 42 is pulled to the left by the forward operation of the load motor 325, running either continuously or intermittently. As the shear box moves toward the left, the microswitch 342 is closed, actuating relay 286 to drive the shear motor 245 forwardly. Forward operation of the shear motor causes an opposite pull to be exerted on the shear box, tending to return the same toward the right until switch 342 is opened.

With the selector switch 279 at the "B" position, the shear motor operates either continuously or by increments, depending on whether the three pole, double-throw selector toggle switch 344 on the control panel is at position "I" or "II," to pull the shear box to the right. At the same time, the load motor 325 is on automatic controls to exert a counterbalancing pull toward the left on the shear box by stretching the spring 294. When the sample 50 finally shears through, the anchorage for screw shaft 200 is lost, and the shear box gives way to the left under the pull of the stretched spring 294. This movement of the shear box to the left closes microswitch 342, actuating relay 289 and causing the load motor 325 to start up in reverse so as to release the tension in the spring 294.

Microswitch 356 faces in the other direction, and is actuated when its operating plunger is engaged by an adjustable limit stop 357 on partition 46 as the shear box 42 moves toward the right. Switch 356 is normally open, and is adapted to be operatively connected to either of two relays 287 or 288, depending on whether selector switch 279 is at the "A" or "B" position. If, when the selector switch is at the "A" position, the shear box is moved to the right, closing microswitch 356, relay 287 is actuated to drive the shear motor in reverse. With the selector switch 279 at the "B" position, the shear box is pulled to the right by the shear motor 245 which is operating either continuously or by increments, depending on whether selector switch 344 is at "I" or "II," while the load motor 325 is on automatic controls. As the shear box moves toward the right, microswitch 356 is closed, actuating relay 288 to drive the load motor forwardly until the shear box has been pulled back by the spring 294 sufficiently to open the switch.

In addition to the foregoing automatic control switches, there are also five limit microswitches 340, 346, 350, 353, and 354 mounted on top of the shear box 42, which function to shut off the motors 245 and 325 in the event that either the shear box or the screw shaft 200 travels past certain predetermined limits.

Limit switch 340 faces to the left and functions to shut off the forwardly-running load motor 325 when the shear box has reached the left hand limit of its travel. Microswitch 340 is normally closed and is operatively connected to the coil of relay 288 which controls the forward drive circuit to the load motor. When the operating plunger of the switch is engaged by the adjustable limit stop 341 on partition 182, the circuit to the coil of relay 288 is broken, which stops the forwardly-running load motor.

Limit switch 346 also faces to the left, and functions to shut off the reverse-running shear motor 245 when the shear box 42 has reached the left hand limit of its travel. Microswitch 346 is normally closed, and is opened when its operating plunger is engaged by an adjustable limit stop 347 on partition 182, thereby breaking the circuit to the coil of relay 287, and stopping the reverse-running shear motor.

Microswitch 354 faces to the right, and functions to shut off the forwardly-running shear motor 245 when the shear box has reached the right hand limit of its travel. Microswitch 354 is normally closed, and is operatively connected to the coil of relay 286, so that when actuated by adjustable limit stop 355 on partition 46, the circuit to the coil of relay 286 is broken, stopping the forwardly-running shear motor.

Microswitches 350 and 353 are limit switches that function to shut off the shear motor 245 when the screw shaft 200 has reached the right-hand or left-hand limit of its travel. Normally closed microswitch 350 is opened by an adjustable limit stop 351 on the outrigger slide 232 when the latter has reached the right-hand limit of its travel, thereby breaking the circuit to the coil of relay 287 and stopping the shear motor from running in reverse. The operating plunger of switch 353 is engaged by the slide 232 when the screw shaft 200 has reached the left-hand limit of its travel, which breaks the circuit to the coil of relay 286 and stops the forwardly-running shear motor.

The adjustable limit stops 343 and 357 are set up so that the automatic control switches 342 and 356 are actuated slightly ahead of the limit switches; hence, during normal operation of the machine, the movement of the shear box to one side or the other is checked by the automatic control switches before the limit switches are engaged. Thus, the limit switches are usually engaged and actuated only at the completion of a test, when the sample has sheared through and the screw shaft 200 has lost its anchorage, allowing the shear box to give way to the left; or when the shear box overtravels its limits to the right or left while the machine is being operated on the manual controls.

Figure 18:
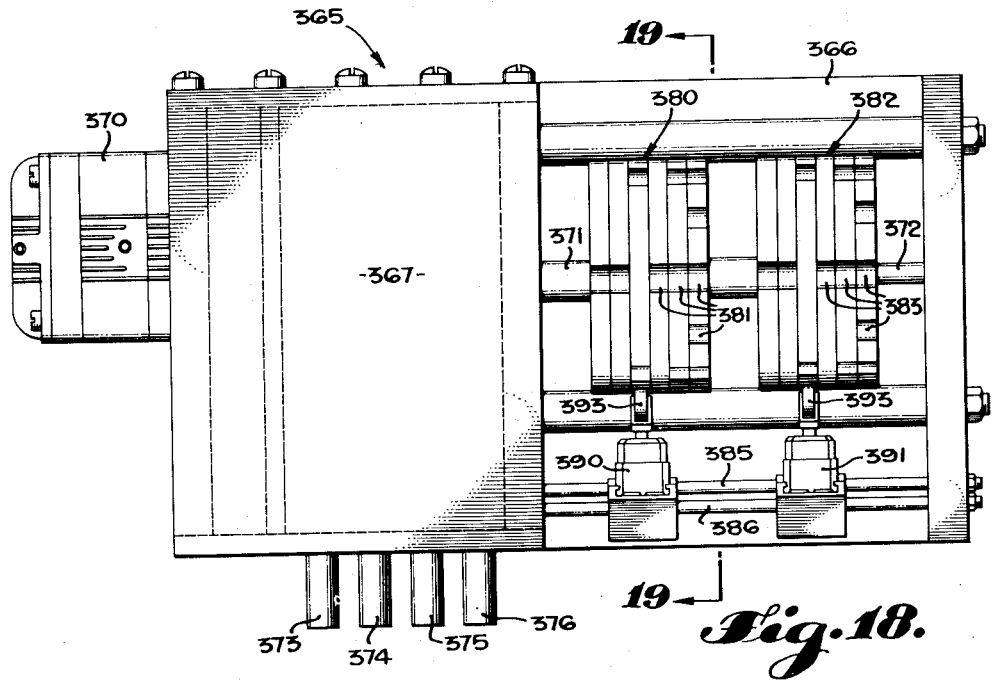
Figure 18 is a top plan view of the timer mechanism for transmitting momentary current impulses to the machine at predetermined intervals of time to actuate the motor-starting relays when increasing the shearing deflection or load by increments, and for actuating the recorder solenoids.
Figure 19:
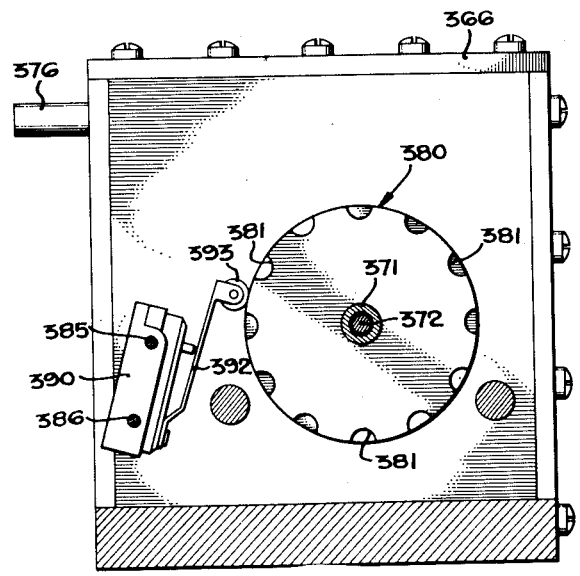
Figure 19 is a vertical section through the same, along line 19—19 of Figure 18.

Under certain conditions, it is desirable to run tests wherein either the load or shear deflection is applied to the soil sample by increments. To this end, an increment timer 365 is provided, which sends out current impulses at predetermined intervals of time, that energize the relays 286 or 288 to actuate the shear or load motors briefly. The increment timer is preferably, although not necessarily, mounted in the control panel 336, as shown in Figure 20. In Figures 18 and 19, the timer unit 365 is shown removed from the control panel, and is seen to comprise a housing 366 which includes a gear box 367. Mounted on the left hand end of the gear box 367 is a synchronous motor 370, which drives an outer, tubular shaft 371 and inner shaft 372 through the speed-reduction gears in the gear box 367. Projecting forwardly from the front of the gear box 367 are four gear ratio selector buttons 373, 374, 375 and 376 which give speeds of one revolution every four hours, three hours, two hours, and one hour, respectively, to the outer shaft 371. The inner shaft 372 turns at a constant rate of one-half revolution per minute, and is unaffected by the operation of the gear ratio selector buttons.

Fixed side by side on the outer shaft 371 is a plurality of cam disks 380 which are provided on their peripheral edges with semi-circular notches 381. From left to right, the cam disks 380 are provided with one, two, three, four, six, and twelve notches 381, respectively, said notches being equally spaced apart on each of the cam disks. Another bank of circular cam disks 382 is mounted on the inner shaft 372 of the timer, and these are likewise provided with semi-circular notches 383 in their peripheries, in the same order as in cam 380.

Extending across the front of the cams 380 and 382, parallel to the shafts 371, 372, are two rods 385 and 386. Slidably mounted on these rods are microswitches 390 and 391, each of which has a spring arm 392 attached at one end thereof to the switch body, and carrying a roller 393 at its other end. The roller 393 of switch 390 is adapted to ride on the periphery of any one of the cam disks 380, and drops into the notches 381 as the latter pass under the roller. When the roller 393 is riding on the surface of one of the cams 380, arm 392 engages the operating plunger of the microswitch 390 to hold the latter open; and when the roller 393 drops into one of the notches 381, the contacts of microswitch 390 are closed. In like manner, roller 393 of switch 391 is adapted to ride on the periphery of any one of the cam disks 382, and the normally open contacts of switch 391 are closed when the roller drops into the notches 383. Inasmuch as the cams 380 can be made to rotate at any one of the four speeds selected by the buttons 373—376, and microswitch 390 can be actuated by any one of the six cam disks, it is possible to obtain current impulses at intervals of 5, 10, 15, 20, 30, 40, 45, 60, 80, 90, 120, 180 or 240 minutes. Cams 382, being limited to only one rotational speed, make it possible to obtain current impulses for the recorder mechanism every 10, 20, 30, 40, 60, or 120 seconds.

Microswitch 390 is operatively connected to the coil of a two-pole, double-throw impulse relay 395 (Figure 21), the poles of which are thrown from one side to the other by successive current impulses from the microswitch 390. One pole 396 of the relay operates on the circuit actuating the load motor 325, while the other pole 397 operates on the circuit to the shear motor 245. Only one of the two poles 396, 397 carries current at any given time, as determined by the setting of selector switch 279 on the control panel; said switch sending current to pole 396 to operate the load motor when at the "A" position, and to pole 397 to operate the shear motor when at the "B" position. It might also be mentioned at this point that current is sent to the timer microswitch 390 only when the selector switch 344 is at position "I."

Pole 396 of the relay closes the circuit first to one side and then the other of a single-pole, double-throw, load increment microswitch 400 mounted on a supporting bracket 401 which is fixed to the outer edge of an L-shaped, vertical plate 402. The plate 402 is disposed approximately mid-way between the partition 182 and end wall 30, and is fixed to the back wall 33 and bottom 29 of the housing, with the horizontal bar of the L extending underneath the spring carriage 314. The microswitch 400 is disposed parallel to the direction of travel of the spring carriage 314, and is provided with a spring arm 403, carrying a roller 404 which is adapted to run on a straight increment cam 405 that is secured by screws 406 to the outer edge of the bottom panel 315 of the spring carriage. The increment cam 405 is provided with alternate high and low portions of suitable length, and is adapted to be interchanged with other cams having high-low portions of greater or lesser length, so that the load increments may be varied to suit the requirements of a particular type of soil. When the roller 404 is resting on one of the low portions, the pole of the microswitch 400 is closed to one of the contacts therein, and when the roller 404 is on top of the high portions of the cam, the pole of the microswitch is closed to the other contact. The lengths of the high and low portions of the cam 405 are such that the pole of the microswitch 400 is closed to each of the aforesaid contacts for equal increments of travel of the spring carriage 314. Microswitch 400 is operatively connected to the coil of relay 288 and, when the circuit is closed, acts to energize the said relay to close the forward drive circuit to the load motor 325.

The other pole 397 of the impulse relay 395 closes the circuit first to one side and then the other of a single-pole, double-throw, shear increment microswitch 411 that is supported within the shear box 42 on a slide 412. The slide 412 is seated in a rabbeted slot 413 in the top panel of the shear box, and is slidable therein along a path parallel to the axis of the screw shaft 200. Projecting downwardly from the underside of the slide 412 are bracket members 414 and 415 which hold the microswitch 411; the latter bracket member being adjustable vertically with respect to the slide so as to adjust the angular position of the microswitch.

The microswitch 411 is provided with a spring arm 416 carrying a roller 417 which is adapted to run on the periphery of any one of five circular cam rings 420 mounted on the back side of the gear wheel 235. The cam rings 420 are bolted to one side of a cam plate 421 which fits against the back side of the gear wheel 235, and the cam plate is secured by bolts 422 to a clamp plate 423 on the other side of the gear wheel. Each of the cam rings 420 is provided with alternate high and low portions of suitable length, and when the roller 417 is resting on the high portion, the pole of the microswitch 411 is closed to one of the contacts thereof. When the roller 417 drops down into the low portion of the cam, the pole of the microswitch is closed to the other contact. The lengths of the high and low portions of each of the cam rings 420 are such that the pole of the microswitch 411 is closed to each of the aforementioned contacts for equal increments of angular travel by the gear wheel 235. Microswitch 411 is operatively connected to the coil of relay 286 and when the circuit is closed, acts to energize the said relay to close the forward drive circuit to the shear motor 245.

From left to right in Figures 3 and 8, the cam rings 420 are provided with one, two, three, four, and five pairs of high and low cam portions (not shown) which function to shut off the shear motor 245 after gear wheel 235 has rotated one-half, one-quarter, one-sixth, one-eighth, and one-tenth of a revolution, respectively. In the preferred embodiment of the invention, the thread 220 on the screw shaft 200 has a pitch of one-tenth of an inch; hence the axial movement of the screw shaft, or shear deflection of the sample, proceeds in increments of .05, .025, .0166, .0125, or .01 inch, depending upon which cam ring actuates the microswitch 411.

A pointer 425 is fixed to the slide 412 and cooperates with a scale 426 on the top of shear box panel 179 to indicate which of the cam rings 420 is acting on the microswitch 411. The microswitch 411 is shifted from one cam ring to another by moving the slide 412 along the slot 413 until the pointer 425 registers with the index mark for the desired cam ring. When the microswitch 411 is not in use, the slide 412 is shifted all the way over to the left in slot 413 so that the roller 417 lies beyond the cam rings and is not engaged thereby.

During the operation of the machine, the results of the tests are recorded by the mechanism 44 on a sheet 430 of coordinate paper which is attached by spring clips to the top surface of the data board 317. The recorder mechanism 44 consists of two separate units 431 and 432 which are mounted on a bridge member 433 extending from front to rear across the top of the machine. Unit 431 is operatively connected to the surcharge mechanism 40, and gives the surcharge vs. load relationship during the progress of the test; while unit 432 is operatively connected to the shearing deflection mechanism 41, and gives the deflection vs. load relationship.

Figure 15:
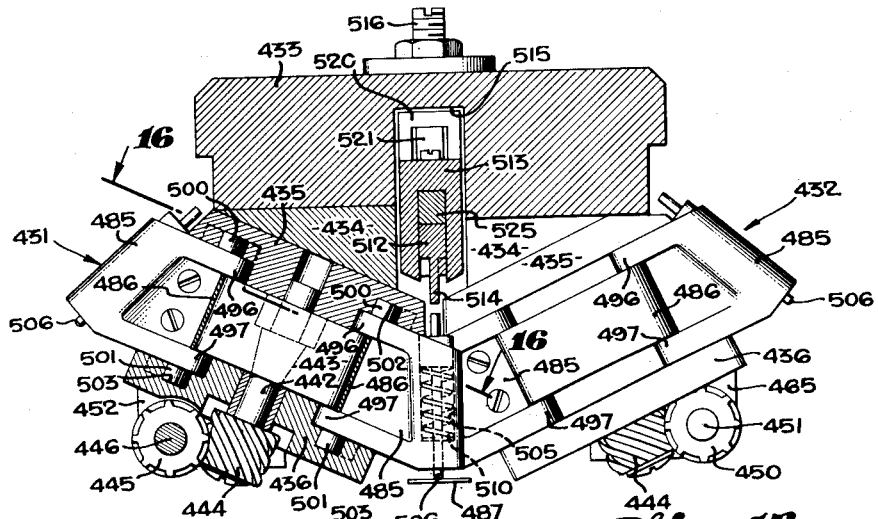
Figure 15 is an enlarged sectional view through the recorder mechanism, taken at 15—15 in Figure 1.

The two units 431, 432 are spaced apart from one another both longitudinally and laterally, as shown in Figure 1, and are secured to oppositely facing, wedge-shaped blocks 434 on the under side of the bridge 433, so that the units are tilted in opposite directions about their longitudinal axes, with their low sides overlapping, as shown in Figure 15. The two units 431, 432 are identical in all respects except as to the drive, and the following description of unit 431 will therefore be understood to apply equally to unit 432.

Figure 16:
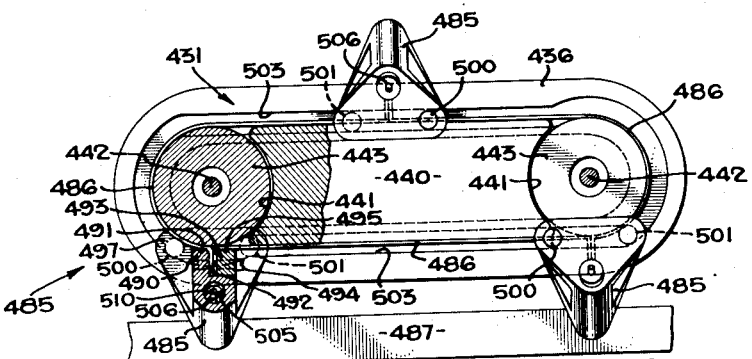
Figure 16 is a sectional view through one of the recorder units, taken at 16—16 in Figure 15; showing one of the stylus carriers at the point of leaving the inked ribbon at one end of the device, and another stylus moving into operative position over the ribbon at the other end thereof.
Figure 17:
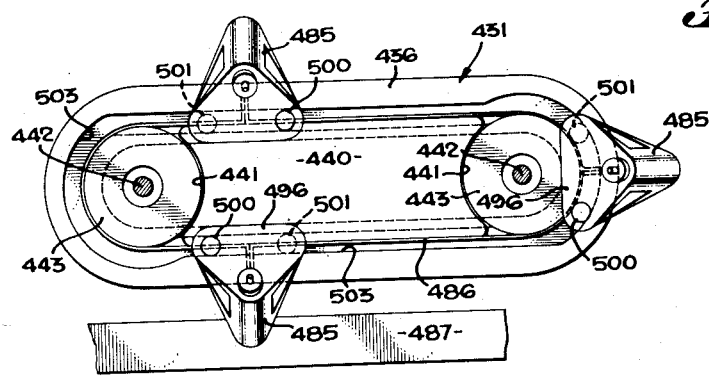
Figure 17 is a view similar to Figure 16, but showing the stylus holders in another position on the recorder unit.

The recorder unit 431 consists of top and bottom guide plates 435, and 436, which are spaced apart by a filler block 440, the ends of which are cylindrically concave at 441, as seen in Figures 16 and 17. Journalled in alined bearing holes in the plates 435 and 436 near each end thereof, are axles 442, on which are mounted pulleys 443. Each of the axles extends downwardly below the bottom guide plate 436 and has a spiral gear 444 affixed to the projecting end thereof. Meshing with the gears 444 of unit 431 are companionate spiral gears 445 on a horizontal drive shaft 446 which extends forwardly therefrom toward the front of the machine; while gears 444 of unit 432 are driven by two spiral gears 450 on another horizontal drive shaft 451 extending rearwardly toward the back of the machine.

Drive shaft 446 is supported between gears 445 in a bearing block 452 fixed to the underside of the bottom guide plate 436, and is operatively connected at its front end by spiral gears 453 (Figure 1) to a shaft 454. Shaft 454 extends to the right through openings in the partition members 182 and 45, and is rotatably supported at its right hand end in a bearing block 455 which bridges the gap between plates 89 and 32. Mounted on the shaft 454 adjacent the bearing block 455 is a spiral gear 456 which meshes with another spiral gear 457 that is journalled on a spindle extension 458 of the top lead screw 90 in the surcharge mechanism.

The spiral gear 457 is adapted to be disconnectably coupled to the spindle extension for rotation therewith by means of a friction clutch 460, comprising an outer housing 461 and central knob 462. The friction clutch 460 is preferably a cone clutch, the operating parts of which are engaged or disengaged by turning the knob 462 with respect to the housing 461. When the clutch is disengaged, the lead screw 90 turns without driving the shaft 454, and when the clutch is engaged, the two shafts 90 and 454 rotate together. From the foregoing, it will be seen that the pulleys 443 of the recorder unit 431 are driven by the surcharge lead screw 90, and the angular position of the pulleys is therefore determined at all times by the number of revolutions made by the lead screw 90.

Drive shaft 451 for the other recorder unit 432 is journalled between gears 450 in a bearing block 465 mounted on the underside of the bottom guide plate 436, and is rotatably supported at its back end by a bearing support block 466 on the plate 402. A gear 470 on shaft 451 meshes with a worm 471 on a shaft 472 which extends to the right and is journalled at one end in a bearing support block 473, and adjacent the other end, in a bearing 474. At its right-hand end, the shaft 472 is connected by a flexible coupling member 475 to another shaft 476 which is journalled in bearings 480 in the shear box 42 and moves longitudinally therewith. The flexible coupling member 475 permits a certain amount of axial movement of shaft 476 with respect to shaft 472, and thus enables the two shafts to rotate as one, in spite of the fact that shaft 472 is constrained against axial movement, whereas shaft 476 moves axially with the shear box.

Mounted on shaft 476 within the shear box is a gear 481, which meshes with a worm 482 fixed to shaft 251 near the top end thereof. Thus, pulleys 443 of the recorder unit 432 are driven by the shear deflection drive shaft 251, and the angular position of the pulleys is determined at all times by the number of revolutions made by the drive shaft 251.

Each of the recorder units 431, 432 is provided with three generally triangularly shaped stylus carriers 485 mounted on a Phosphor bronze tape 486, and the latter is trained around the pulleys 443 in the manner of an endless belt. The carriers 485 are spaced apart on the tape so that the center-to-center distance between the styli is the same as the distance between the centers of the pulleys 443, and the pulleys are of a diameter such that the circumference is equal to the distance between the styli. Thus, there is always one carrier in operative position above the inked ribbon 487 which lies underneath the straight portion of the recorder unit at the low side thereof, except for the instantaneous condition shown in Figure 16, wherein one of the carriers is at the point of leaving the operative position, while the other is at the point of entering the same at the other end of the unit.

The tape 486 is preferably made up of three sections, each of which is attached at its ends to two of the stylus carriers 485. As best shown in the sectioned portion of Figure 16, the body of the carrier is formed with a vertical rib 490 having a back surface 491 and a laterally facing clamping surface 492 at right angles thereto. The corner forming the junction of the two surfaces is smoothly rounded, and the end of one of the sections of tape 486 is brought around the corner and laid flat against surface 492. The end of the next tape section is laid on top of the previously mentioned section, and the two tapes are then clamped tightly to the rib 490 by a clamp block 493 and screws 494. The back surface 495 of the clamp block 493 is co-planar with the back surface 491 of the rib, and the abutting surfaces of the tape ends between the clamping block and rib lie in a vertical plane bisecting the carrier at its lateral midpoint.

Ledges 496 and 497 extend rearwardly beyond the surfaces 491, 495 at the top and bottom of the carrier, and projecting from the top and bottom surfaces of the ledges 496, 497, respectively, are guide pins 500 and 501. Top guide pin 500 travels in a track 502 formed in the underside of the top guide plate 435, and the bottom pin 501 travels in a track 503 formed in the top side of the bottom guide plate 436. Each of the tracks 502, 503 is formed with parallel straight portions along both sides of the guide plates, which are connected at their ends by circular curved portions concentric with the axes of pulleys 443. It will be noted that the straight portions are not tangent to the circular end portions, but instead, intersect the latter at a slight distance in from the point of tangency. Each of the straight portions cuts chord-wise across the circle at one end, and then enters the circle at the far side; while the other end enters the opposite circle at the point of first intersection.

The top track 502 has the same configuration as the bottom track, but is turned over with respect thereto, so that the flat side of the circle in the top track is diametrically across from the flat side of the corresponding circle in the bottom track. The purpose of this configuration and arrangement of the tracks 502 and 503 is to guide the carriers 485 by the two laterally spaced pins 500 and 501, so that the point of attachment of the carrier to the tape 486, midway between the centers of the pins, follows the path of the tape. Thus, if we assume that the tape is traveling in a clockwise direction around the unit in Figure 16, the top pin 500 (shown in phantom lines) of the lower left-hand carrier has just reached the end of the straight-line portion of the upper track 502, and has entered the circular end portion of the track. At the same time, the bottom pin 501 (shown in broken lines) has just reached the end of the straight-line portion of the lower track 503, and has likewise entered the circular end portion. It will also be noted that the point of attachment of the tape 486 to the carrier is now tangent to the left-hand pulley 443. As the carrier starts around the pulley, the leading pin 500 swings upwardly along its circular track, while the trailing pin 501 swings downwardly along its circular track, and the midpoint between the centers of the pins follows the circle of the pulley 443.

As the carrier 485 reaches the top of the pulley 443, the leading pin 500 swings up over the center of the circle and back down to the straight-line portion of its track, while the trailing pin 501 leaves its circular track and enters the straight-line portion before passing over the center of the circle.

Each of the stylus carriers 485 has a cylindrical bore 505 formed therein, the axis of which is inclined to the plane of the pulley axles 443 so that the said bores are perpendicular to the inked ribbon 487 when the carriers are at the low side of the tilted recorder unit. Slidably disposed within the bore 505 is a stylus 506 which is pressed upwardly by a spring 510. The end of the stylus 506 projects through a hole in the carrier at the bottom of the bore 505, and is adapted to contact the inked ribbon 487 when the stylus is pushed downwardly against the pressure of the spring 510.

The styli 506 of the operatively positioned carriers traveling directly above the inked ribbon 487 are punched downwardly at predetermined intervals of time, pressing the inked ribbon against the coordinate paper 430 and making a series of dots thereon which are later connected by continuous lines to produce curves representing the surcharge vs. load and shearing deflection vs. load relationships of the sample during the progress of the test. The mechanism for punching the styli consists of a ram bar 512 extending transversely across the machine beneath the bridge member 433, and supported from the latter by an inverted channel member 513. The bottom edge of the ram bar 512 is recessed back along the opposite sides thereof to clear the top guide plate 435 of the recorder unit, leaving thin ridges 514 down the center which are disposed directly above and are engageable with the top ends of the operatively positioned styli.

Figure 10:
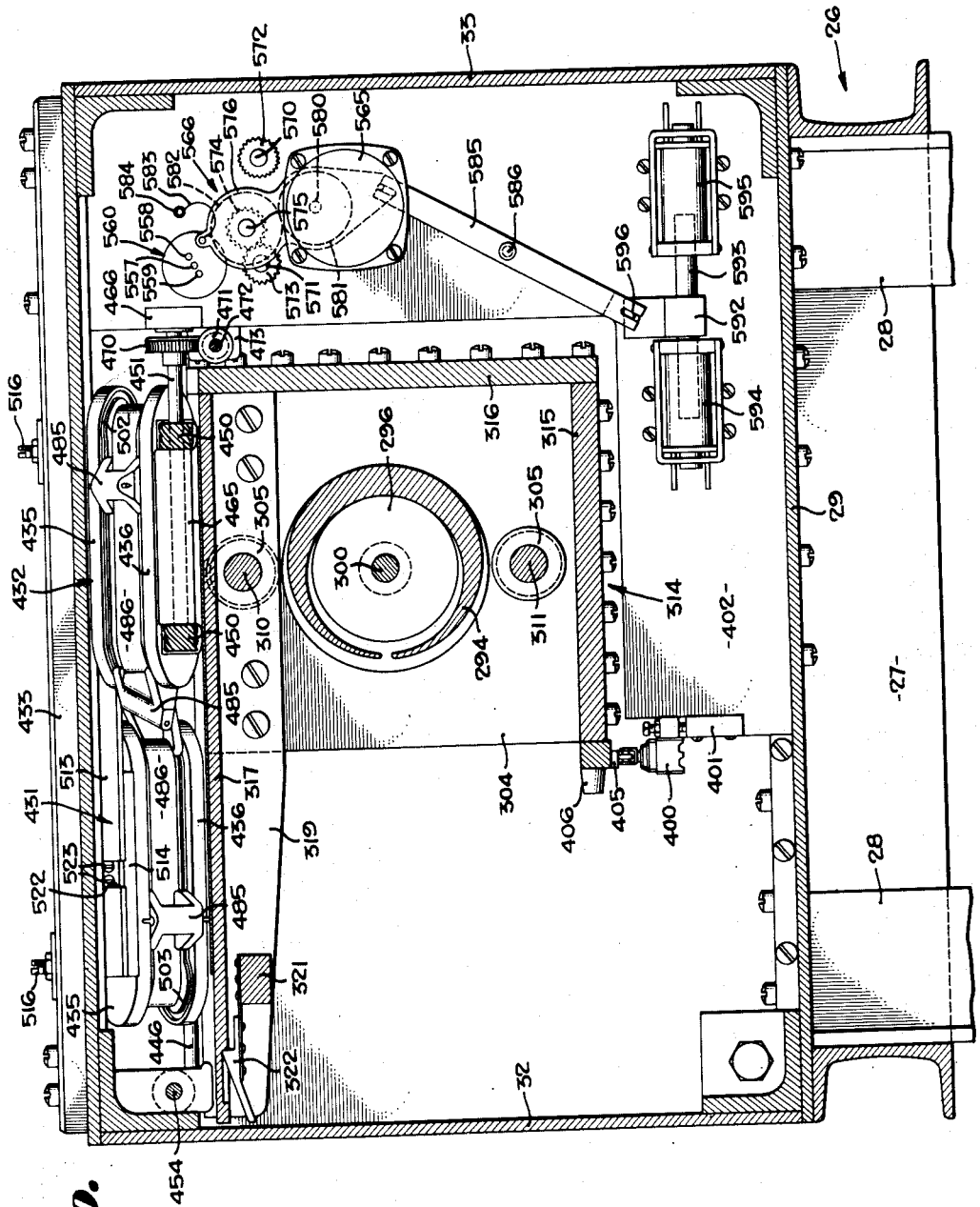
Figure 10 is a transverse vertical section through the machine, as seen along the section line 10—10 in Figure 1.

The channel member 513 is positioned within a longitudinally extending slot 515 in the under side of the bridge member 433, and is rigidly attached to the bridge by two studs 516. The ram bar 512 is slidably disposed between the side flanges of the channel member 513 and is supported by two inverted, U-shaped hangers 520 which pass up over the top of the channel member and rest upon strip spring bridges 521. The arms of the hangers 520 slide up and down within slots 522 (see Figure 10) in the outer side surfaces of the channel member 513, and the bottom ends of the hanger arms are secured by screws 523 to the ram bar 512. The spring bridges 521 provide yieldable support for the ram bar 512 to hold the latter up, clear of the styli 506, and the sliding engagement of the arms of hangers 520 within the guide slot 522 permits the ram bar to move in a vertical direction only.

Slidably disposed within the member 513 between the ram bar 512 and the bottom of the channel is an actuating bar 525 which is connected to the ram bar by links 526 (Figure 11). Each of the links 526 is pivoted to the ram bar 512 by a pin 530, and to the actuating bar 525 by a pin 531, said links being normally laid over to one side or the other of the bottom pin 530, depending upon whether the bar 525 is at the right-hand extremity of its travel, as in Figure 11, or at its left-hand extremity. When the bar 525 is shifted longitudinally from one of said positions to the other, the links 526 swing downwardly about pin 531 from one angular position to the other. Pin 530, being attached to the ram bar 512, can move only in a vertical direction; hence the ram bar is pushed downwardly by the links as the actuating bar is shifted lengthwise in one direction or the other, and the ridge 514 strikes the styli of the operatively positioned carriers 485, causing the styli to make dots on the coordinate paper 430.

The actuating bar 525 is shifted lengthwise from one position to the other by means of a lever 532 which is pivoted at its midpoint on a pin 533 projecting from the vertical partition member 492. The top end of the lever 532 is bifurcated to receive the projecting end of the actuating bar 525, and is slotted in from the end at 534 to receive a pin 535 extending through the bar 525 and projecting laterally from opposite sides thereof. The bottom end of the lever 532 is similarly slotted at 536, and engaged within this slot is a pin 537 projecting laterally from opposite sides of a bracket member 540 which is attached to and moves with the joined armatures 541 of two opposed solenoids 542 and 543.

The solenoids 542 and 543 are energized alternately, shifting the armatures 541 first to the left and then to the right, and rocking the lever 532 about its pivot 533. Current for energizing the solenoids comes from a single-pole, double-throw impulse relay 545 (Figure 21), which is actuated by current impulses from the timer microswitch 391. The top contact R5 of the relay 545 is connected to a normally closed microswitch 546, and the bottom contact R4 thereof is connected to another normally closed microswitch 547, said microswitches being mounted one above the other on the plate 402 alongside the lever 532. Microswitch 546 is connected to the windings of solenoid 542, and microswitch 547 is connected to the windings of solenoid 543. Each of the microswitches has an operating lever which is engaged by one of two screws 550 and 551 on lever arm 532, said screws being spaced equidistantly from the pivot pin 533 on opposite sides thereof. When solenoid armatures 541 are shifted to the left, and the lever 532 is in the clockwise position shown in Figure 11, screw 551 engages the operating lever of microswitch 546, opening the same and breaking the circuit to solenoid 542. When the armatures 541 are shifted to the right, microswitch 546 is disengaged, and screw 550 engages the operating lever of microswitch 547, breaking the circuit to solenoid 543.

Normally, the pole of relay 545 is closed to whichever microswitch 546, 547 is open, and neither of the solenoids 542, 543 is energized. Upon receiving a current impulse from the timer microswitch 391, relay 545 is energized, throwing the current-carrying pole over to the other contact which is connected to the closed microswitch. This enables the circuit to be completed now through the windings of the solenoid, connected to the closed microswitch, and armatures 541 are therefore pulled over towards the energized solenoid, rocking the lever 532 over to its other position. As the lever approaches its new position, the microswitch carrying current to the active solenoid is engaged and opened by one of the screws 550, 551, which breaks the circuit to the said solenoid. The microswitch to the other solenoid is now closed, and the mechanism is in readiness to repeat the operation in the opposite direction the next time that relay 545 is energized.

The inked ribbon 487 of the recorder unit is preferably the same as that used in typewriters, and its opposite ends are attached to two spools 555 and 556 which are rotatably supported, side by side, on the plate 402 just above microswitch 547. Upon leaving the spool 555, the ribbon 587 passes between the center post 557 and outer post 558 of an automatic reversing switch device 560, then stretches forwardly across the top of the data board 317 just above the coordinate paper 430. At the front end of the machine, the ribbon passes under a small roller 561 journalled on a bracket 562, and then over and around a larger roller 564. Leaving the roller 564 from the bottom side thereof, the ribbon 487 doubles back across the data board beneath the previously described course, and passes between the center post 557 and outer post 559 of switch 560, to spool 556.

The spools 555 and 556 are adapted to be driven in alternate succession by an electric motor 565 and shiftable gear drive 566 on the other side of the plate 402, whereby the ribbon is first unreeled from one spool and reeled up on the other, then reversed in direction. To this end, the spools 555, 556 are mounted on rotatable shafts 570 and 571 extending through the plate 402, and fixed to said shaft on the other side of the plate are gears 572 and 573 which are adapted to be selectively engaged by gear 574 of the drive 566. Gear 574 is mounted on the projecting outer end of a shaft 575 which is journalled in a housing 576. Housing 576 is pivotally supported on the drive shaft 580 of the motor 565, and includes two laterally spaced plates, between which are disposed intermeshing gears 581 and 582 mounted on shafts 580 and 575, respectively.

The housing 576 is adapted to rock between the two positions shown in Figures 13 and 14, to mesh gear 574 with one or the other of gears 572, 573, and is yieldingly held at either position by a bowed spring 583 which is anchored to a post 584 on the plate 402. Spring 583 acts as a snap spring, exerting a clockwise force on the housing 576 when the point of attachment of the spring with the housing lies to the right of the line connecting the centers of pivot shaft 580 and anchor pin 584, and a counter-clockwise force thereon when said point passes to the left of said line.

The housing 576 is rocked from one position to the other by a lever 585 which is pivoted at its midpoint on a bolt 586 that is screwed into the plate 402. The top end of the lever 585 is bifurcated to receive an extension of the housing 556, and is slotted to take a pin 590 projecting from opposite sides of said extension. The bottom end of the lever 585 is likewise bifurcated to receive an upwardly extending flange 591 on a member 592 connecting the armatures 593 of two opposed solenoids 594 and 595, and is also slotted to take a pin 596 projecting from opposite sides of the flange 591. When solenoid 594 is actuated, lever 585 is swung over to the position shown in Figure 13, engaging gear 574 with gear 573 and driving the ribbon spool 556. When solenoid 595 is actuated, lever 585 is shifted to the position shown in Figure 14, meshing gear 574 with gear 572 and driving ribbon spool 555.

Current for energizing the solenoids 594, 595 in the proper sequence and at the right time, comes from the automatic reversing switch 560, the posts 557, 558 and 559 of which are made of copper or other conductive metal embedded in an insulator base 600 which is mounted on the plate 402. The center post 557 carries current from the power line; while post 558 is connected to the windings of solenoid 595, and the other post 559 is connected to the windings of solenoid 594. The circuit is completed from the center post to one of the outer posts and thence to the solenoid associated therewith when one of the brass eyelets or buttons at each end of the typewriter ribbon 487 touches the two posts on either side of the ribbon. Thus, for example, if the mechanism is in the condition shown in Figure 13, with gear 574 meshing with gear 573 so that the motor 565 drives spool 556, the typewriter ribbon 487 will be wound up on spool 556 and unwound from spool 555. When the brass eyelet near the end of the ribbon reaches the switch 560 and touches both of the posts 557, 558, the circuit is closed to solenoid 595, causing the latter to shift the gear drive mechanism to the position shown in Figure 14, at which point the spool 555 is driven by motor 565, and the ribbon is now unwound from spool 556.

Having now completed the detailed description of the structure of the machine, we will take up next the control panel 336 (Figure 20) by which the operation of the machine is controlled. The control panel 336 is preferably, although not necessarily, contained within its own cabinet apart from the machine, and is connected to the electrical equipment on the machine by a multi-conductor cable 605. In addition to the timer 365 and selector switches 279 and 344, which have already been described, the control panel 336 has a master power switch 606, load motor switch 607, shear motor switch 608, and surcharge motor switch 609. A switch 610 is used to start and stop the machine, and another switch 611 controls the operation of the recorder unit.

The speed of the load motor 325 is regulated by means of a knob 612 which is operatively connected to a variable auto-transformer, while the speed of the surcharge motor 106 is regulated by a knob 613 which operates a rheostat. Above switch 607 are green and yellow indicator lights 614 and 615, respectively; above switch 608 are green and yellow indicator lights 616 and 617, respectively; and above switch 609 are green and yellow indicator lights 618 and 619, respectively. In each instance, the green light lights up when the associated motor is running in the forward direction, while the yellow light comes on when the motor is running in reverse.

Above switch 610 are four white indicator lights 622, 623, 624, and 625; the first two having the letters A and B printed thereon, and the latter two having the numerals I and II printed thereon. These lights show which type of test is being made, and light up to indicate the positions of selector switches 279 and 344. When switch 279 is at A, light 622 comes on; and when at B, light 623 comes on. Likewise, when switch 344 is at I, light 624 comes on; and when at II, light 625 comes on.

Above the recorder switch 611 is a blue light 626 which indicates when the recorder unit is in operation. At the upper right hand corner of the control panel is a red light 630 which indicates that the permissible normal deflection of the sample under the surcharge pressure has been exceeded, and spring plate 86 has actuated the limit microswitch 169. Below the red light 630 is a reset switch 631, and below the latter is a cartridge fuse 632. Along the bottom edge of the control panel 336 are other fuses 633, 634, 635, and 636, which protect certain of the circuits to be described presently. The electrical equipment associated with the recorder unit is protected by its own fuse 637, which is mounted on the control panel beneath switch 611.

In back of the control panel 336 is a terminal board 640 having a plurality of terminal posts provided thereon which are connected to the switches and other electrical equipment on the panel, as indicated by the wiring diagram. The terminals on the board 640 are also connected by individual wires in the cable 605 to the terminals of the same reference characters on another terminal board 641 in what is known as the "electrical deck" of the machine. The electrical deck consists of a horizontal panel or plate 642 which is secured by screws 643 and spacers 644 to the bottom edges of the horizontal frame channel 27, and mounted on said panel, in addition to said terminals, are the several relays controlling the operation of the motors and solenoids, all of which have been described hereinbefore. Since each of the terminals on board 641 having a counterpart terminal of the same reference characters on board 640, is connected to the said counterpart terminal, it will be understood, in tracing any of the circuits, that current reaching a given terminal on one of the boards has also reached the same terminal on the other board. Those terminals on one board which do not have counterparts on the other board are not connected to the cable 605, and therefore are concerned solely with the circuit shown in that figure.

In setting the machine up for a test, the first step, of course, is to place the soil sample 50, with its confining rings 51, 52, 53, in the holders 54, 54, 56 with the caps 55, 55, and 57 closed on the rings and secured by clamps 61. The manually controlled foot switch 175F is then pressed to operate the surcharge motor 106 in the forward direction until the studs 84 on spring plate 86 touch the balls 83 in end plate 82. The surcharge adjustment knob 144 is next turned until the dials 151 and 152 indicate the desired surcharge pressure, after which the switch 609 on the control panel is thrown over to the left, or the side designated "Automatic."

With the closing of switch 609, the surcharge motor 106 starts up and drives the lead screws 90, 91 in the forward direction to compress springs 103, 104 against the spring plate 86 until the adjusting screw 132 engages the cover of the limit switch box 120 and bows the same inwardly. This opens microswitch 121, which stops the motor. Usually, after standing for a few minutes under pressure, the sample tends to consolidate or compact slightly, allowing the screw plates to yield inwardly a few thousandths of an inch. When this occurs, microswitch 121 closes, and motor 106 is made to run forwardly again until the microswitch has been reopened. If the sample should expand slightly during the shearing operation which follows, causing the surcharge pressure to rise, the movement of the spring plate 86 toward the left (Figure 6) causes microswitch 122 to be closed, which starts up the surcharge motor in reverse to relieve the excess pressure and restore the surcharge to the predetermined value.

The electrical circuit for operating the machine as described above is as follows: Electric current enters the control panel through a power line 645, the two wires of which are connected to the master switch 606, and pass from there along a multi-conductor cable 646 to terminals X and O of the board 604. Terminal X is the "hot" side of the line, while terminal O is the grounded side; hence in the discussion that follows, all circuits are traced from X to O. Terminal X is connected to both of the poles of switch 609, which are now engaged with the left hand contacts. The top left hand contact is connected to terminal A2, and the A2 terminal of board 641 is connected to the pole of normally closed microswitch 121. The contact of the microswitch is connected to terminal A3, and the latter is connected to the left hand pole of relay 117, which is normally closed to the top contact, as shown in Figure 21.

From the top left hand contact of relay 117, the current passes over to the coil of relay 118 and then returns to terminal S1, which is connected through fuse 636 to terminal O, thereby completing the circuit.

When relay 118 is energized, the two poles thereof are closed to the top contacts to complete the forward drive circuit to the surcharge motor 106. With the relay 118 in this condition, current travels from the X terminal on board 640, up to the rheostat 613, back to terminal X3 on board 641, then up to the right hand side of the armature on the surcharge motor 106. The left hand side of the armature is connected to terminal M1 which is connected to the right hand pole of relay 118, said pole being now closed to the top contact which is connected through terminal M3 to the left hand side of the field windings in motor 106. The right hand side of the field windings of motor 106 is connected to terminal M2 which is connected, in turn, to the top contact of the left hand pole in relay 118. The left hand pole of relay 118 is connected to terminal S1, which is connected through fuse 636 to terminal O.

When microswitch 121 is opened, the circuit to the coil of relay 118 is broken, thereby disabling the relay and interrupting the forward drive circuit to the surcharge motor. If microswitch 122 is closed, current from the bottom left hand contact of switch 609 travels through terminals A4 to microswitch 122, and thence through microswitches 170 and 171 to terminal S3. Terminal S3 is connected to the coil of relay 119, and the circuit is completed through terminal S1, fuse 636, and terminal O. When relay 119 is energized, the reverse drive circuit to the surcharge motor 106 is completed; in which case the left hand side of the armature of the surcharge motor is connected to the right hand side of the field winding, and the left hand side of the field winding is connected through the left hand terminal and pole of relay 119, to terminal S1, and back to terminal O through fuse 636.

When the limit switch 169 is closed, current from terminal X is transmitted through the switch to terminal S6, and thence to the coil of impulse relay 117 to actuate the same. The coil of relay 117 is connected back to terminal S7, and the circuit is completed through fuse 632 to terminal O. When relay 117 is energized, the two poles thereof are closed to the bottom contacts. The left hand bottom contact is connected through terminal S5 to one side of the red warning light 603, the other side of said light being grounded to terminal O. The right hand bottom contact of relay 117 receives current from the bottom left hand contact of switch 609 through terminals A4, and this current is transmitted through the right hand pole of relay 117 to terminal A1. Terminal A1 is connected through microswitches 170 and 171 and terminal S3 to the coil of relay 119 which, as described earlier, closes the reverse drive circuit to the surcharge motor 106. The surcharge motor continues to run in reverse until microswitch 171 is opened, which breaks the circuit to the coil of relay 119, or until the reset button 631 is pressed. Button 631 closes a switch, one side of which is connected to the line terminal X, and the other side is connected through terminal S6 to the coil of relay 117. Thus, whenever reset button 631 is pressed, the coil of relay 117 is energized, throwing the poles alternately to one side and then the other.

It might also be mentioned at this point that the two manually controlled foot switches 175F and 175R are adapted to transmit current directly from the line terminal X to terminals A3 and S4, respectively. Current which is transmitted to terminal A3 travels to the left hand pole and top contact of relay 117, then over to the coil of relay 118 to energize the same and drive the surcharge motor 106 in the forward direction. Current which is transmitted to terminal S4 travels through microswitch 171 and terminal S3 to the coil of relay 119, which causes the surcharge motor to operate in reverse.

While waiting for the sample to reach a condition of equilibrium under the surcharge pressure, the operator may switch the controls on the panel 336 to the required position to operate the machine in the desired manner. There are four ways in which the machine can be operated: (1) to increase the shearing load by increments, with the shear motor on automatic controls; (2) to increase the shearing deflection by increments, with the load motor on automatic control; (3) continuous loading, with the shear motor on automatic control; and (4) continuous shearing deflection, with the load motor on automatic control.

To set up the machine for loading by increments, with the shear motor on automatic control, selector switches 279 and 344 are thrown to positions A and I, respectively. The timer 365 is then set up to give out current impulses at the desired time interval by pressing the proper gear ratio selector button and moving the microswitch 390 to the appropriate cam disk 380. A load increment cam 405 giving the desired load increment is attached to the carriage 314 by screws 406, and the machine is then ready to make the test.

When the starting switch 610 is thrown over to the "on" position, the following circuit is established: starting with the extreme right hand X terminal on board 641 current is transmitted up to one side of microswitch 48, which is closed when the cover 47 is in place, and then returns to terminal X1. From X1 on the control panel, the current is directed up to the top pole of the starting switch 610, which is closed to the contact at the left, and is then returned to terminal X2, where it divides three ways: one branch going up to the bottom pole of selector switch 279; another branch going up to the bottom pole of selector switch 344; and the third branch following cable 605 back to terminal X2 on the electrical deck. The branch going to selector switch 344 is the principal one, and leads over to the bottom left hand contact, then down to terminal I3. At I3, a portion of the current is directed up to lamp 624 on the panel to light up the same, and then returns through terminal I2 and fuse 634 to the line terminal O.

The main portion of the current at terminal I3 is transmitted up to timer microswitch 390, and when the latter is closed by the cam, returns to terminal I1, where it takes cable 605 to the electrical deck. From I1 on the electrical deck, the current travels down to the coil of impulse relay 395 to actuate the same, and then returns by terminal I2, cable 605, and fuse 634 to line terminal O, which completes the circuit.

When relay 395 is actuated, the poles 396 and 397 are thrown from one side to the other. The top contact of pole 396 is connected to terminal I7, and the bottom contact thereof is connected to terminal I6. Terminals I6 and I7 are connected to the two contacts of the single pole, double-throw, load increment microswitch 400, and the pole of the latter is connected to terminal L4, which is operatively connected to the coil of relay 288, as will be described in more detail presently. Up until the time relay 395 is actuated, the circuit closed by pole 396 is broken at microswitch 400, due to the fact that the poles of the relay and microswitch are closed to opposite contacts. Thus, for example, if the pole 396 is closed to contact I7, then the pole of the microswitch 400 is closed to contact I6, and contact I7 is open. When relay 395 is actuated, pole 396 is closed to the other contact, and the circuit is then completed through the microswitch 400. This enables current to travel from the bottom pole of selector switch 279, over to the left hand contact, and then down to terminal B1, where the current divides. A portion of the current at terminal B1 is conducted up to lamp 622 on the control panel to light up the same, and completes its circuit through terminal I2, and fuse 634 to line terminal O. The remainder of the current at B1 is directed to the top pole of selector switch 344. Here the current passes over to the left hand contact, then down to terminal I4, over to the electrical deck, and down to the left hand pole 396 of relay 395. From this point, the current travels through either contact I6 or I7 to microswitch 400, returning to terminal L4.

At terminal L4, the current divides, with a portion going up to the green light 614, and thence through fuse 633 to line terminal O. The balance of the current leaving terminal L4 travels along cable 605 to the electrical deck, up to normally closed microswitch 340, and then back down to terminal L5. From terminal L5, the current is transmitted up to normally closed microswitch 336, and then returns to terminal L6. Leaving L6, the current travels down through the coil of relay 288 to energize the same; then back up to terminal L3; along cable 605 to the control panel; and finally through fuse 633 to line terminal O.

When relay 288 is actuated, the following circuit is closed to the load motor 325: current starts from terminal X on control panel 336, traveling up to the variable auto-transformer 612, back to terminal X5, over to the electrical deck, then up to the right hand side of the armature of load motor 325. The left hand side of the armature is connected to terminal M9 leading down to the right hand pole of relay 288, which is now closed to the top contact, thereby carrying current back to terminal M8. Terminal M8 is connected to the left hand side of the field windings of the load motor, and the other side thereof is connected to terminal M7, which leads back to the top contact of the left hand pole of relay 288. The left hand pole of relay 288 is likewise closed to its top contact while the relay is energized, and current is thus carried back to terminal L3, thence to fuse 633, and finally to line terminal O to complete the circuit.

With the forward drive circuit to the load motor 325 thus completed, the motor starts up and drives the screw plate 304 and spring carriage 314 to the left, stretching springs 294. If the roller 404 of microswitch 400 is riding on a low portion of cam 405 at the start of this cycle, the load motor 325 continues to operate until the roller is lifted by the cam to the top of the next high portion thereof, which causes the pole of microswitch 400 to be thrown over to the other contact, thereby breaking the circuit to relay 288 and stopping the load motor. If, however, the roller 404 is riding on a high portion of cam 405 at the start of the cycle, the load motor continues to operate until the roller drops down to the next low portion thereof, which causes the pole of microswitch 400 to be thrown over to the other contact. In either event, the load motor 325 runs forwardly until the carriage 314 has advanced a distance equal to one of the portions of cam 405, whether high or low, and then stops.

During the time that the carriage 314 is moving to the left, the increasing tension of the spring 294 is transmitted to the shear box 42, tending to pull the latter to the left. This causes the automatic control microswitch 342 on top of the shear box to be closed, completing the following circuits to start the shear motor 245 in the forward direction, so as to exert a counterbalancing force on the shear box, tending to pull the latter back toward the right.

Starting with terminal X2 on the electrical deck, current is transmitted to microswitch 278 and returns then to terminal X4. Terminal X4 is connected to the now-closed automatic control microswitch 342, and the latter is connected through terminals A5 to the top pole of selector switch 279. Since switch 279 is not at the A position, the current is conducted over to the top left hand contact and is then returned to terminal D4, where it divides two ways. One portion of the current at D4 travels up to the green light 616 to light up the same, and then completes its circuit through terminal D3 and fuse 635 to line terminal O.

The remainder of the current at D4 travels back to the electrical deck, up to microswitch 353, through microswitch 354, and back to terminal D5. Terminal D5 is connected to one side of the coil in relay 286, and the other side thereof is connected through terminal D3, and fuse 635 to line terminal O. The current that is thus conducted to the coil of relay 286 by the closing of microswitch 342 causes the said relay to be energized, closing the following circuit to the shear motor 245.

Starting with the extreme right hand X terminal on the electrical deck, current is transmitted up to the right hand side of the armature of shear motor 245, and down from the other side to terminal M6. Terminal M6 is connected to the right hand pole of relay 286, which is now closed to the top contact, and the latter is connected through terminal M4 to the left hand side of the field windings in the shear motor. The other side of the field windings is connected through terminal M5 to the top contact of the left hand pole in relay 286, and current is transmitted from the pole to terminal D3, then back through fuse 635 to the line terminal O. With the forward drive circuit to the shear motor 245 thus completed, the motor starts up and drives the gear wheel 235 until the pull exerted by the screw shaft 200 on the soil sample causes the shear box to be drawn back toward the right, reopening microswitch 342, and stopping the motor 245.

The machine continues to operate in the manner set forth above, with the load being added in predetermined increments, and the shearing deflection progressively increased under the control of the automatic switch 342, so that the shear box 42 remains in a state of equilibrium until the sample finally shears through. When this happens, the shear box gives way to the left, opening microswitch 340 and breaking the forward drive circuit to the load motor 325.

Prior to the start of the test, a sheet of coordinate paper 430 is attached to the data board 317, and the time microswitch 391 is moved along the rods 385, 386 to a cam disk giving impulses of the desired frequency. When the machine is started, the recorder switch 611 is thrown over to the "on" position, sending current from the X terminal over to the top contact, which is connected to terminal R2. At R2 the current divides three ways, with one portion going up to blue light 625 to light up the same, another portion going over to the timer motor 370 to drive the same, and the third portion being transmitted over to terminal R2 on the electrical deck. The circuits for both the blue light 626 and the motor 359 are completed through terminal R3 and fuse 637 to the bottom contact of switch 611, from which the current returns along the bottom pole of the switch to line terminal O. Terminal R2 of the electrical deck is connected to one side of the coil of impulse relay 545, and the other side of the coil is connected to terminal R1. From R1 on the control panel, the current passes through microswitch 391 and finally completes the circuit through fuse 637, terminal R3, and the bottom contact of switch 611 to line terminal O.

When the impulse relay 545 is energized, the pole, which is connected to terminal R3, is thrown from one side to the other. The bottom of the two contacts in the relay is connected to terminal R4, and the top contact to R5. Terminal R4 is connected to microswitch 547, which carries current to solenoid 543; while terminal R5 carries current to microswitch 546 and solenoid 542. Both of the solenoids 542 and 543 are connected to terminal R2, and the latter transmits current back to the top contact of switch 611 to complete the circuit. Current for the solenoids 542 and 543 thus travels from X to R2 to solenoids 542 or 543 (depending upon which of the microswitches 547 and 546 is closed and which is open), then down to one of the contacts R4, R5 of relay 545, along the pole of the relay to terminal R3, switch 611, and line terminal O. When solenoid 542 is energized, lever arm 532 is rocked in the clockwise direction, opening microswitch 546 and closing microswitch 547. The next time relay 395 is energized, current is transmitted through microswitch 547 to solenoid 543, actuating the latter to reopen microswitch 547 and close microswitch 546.

Current for operating the ribbon drive motor 565 starts from terminal R2 on the electrical deck, which is connected through switch 611 to line terminal S. From R2, the current passes through the windings of motor 565 and through condenser 650, then back through terminal R3 to the bottom pole of switch 611, and finally to line terminal O.

The two solenoids 595 and 594 are both connected at one end to terminal R2, the other ends being connected to outer posts 558 and 559, respectively, of the automatic switch 560. The center post 547 of the switch is connected to terminal R3. When the metal eyelet at the end of the inked ribbon closes the circuit from the center post 557 to one of the outer posts 558, 559, the associated solenoid is actuated to shift the drive gear 574 from one driven gear to the other.

To set up the machine for increasing the shearing deflection by increments, with the load motor on automatic controls, selector switches 279 and 344 are thrown to positions B and 1, respectively. When the starting switch 611 is thrown over to the "on" position, the following circuit is established:

Starting from the extreme right hand X terminal of board 641 in the electrical deck, the current travels up to microswitch 48, then down to terminal X1 and back to the top pole of the starting switch 610. The poles of the switch are closed to the contacts at the left, and the current is thus returned to terminal X2, where it divides three ways: one branch going up to the bottom pole of selector switch 279; another branch going to the bottom pole of selector switch 344; and the third branch following cable 605 back to the terminal board 641 on the electrical deck.

As already described hereinbefore, the branch going to selector switch 344 leads over to the bottom left hand contact and then down to terminal I3, where a portion of the current is diverted up to indicator light 624 to light up the same, while the remainder of the current is transmitted to timer microswitch 390, from which it is carried to the coil of relay 395 to actuate the same. When relay 395 is actuated, current from the bottom right hand contact of switch 279 is transmitted down to terminal B2, where it is divided two ways, one portion going up to indicator light 623 to light up the same, and the other portion going to the center pole of switch 344, where it is transmitted over to the contact at the left which is connected to terminal I5. Terminal I5 in the electrical deck is connected to the right hand pole 397 of relay 395. The top contact of pole 397 is connected to terminal I9, and the bottom contact thereof is connected to terminal I8. Terminals I8 and I9 are connected to the two contacts of the single pole, double-throw, shear increment microswitch 411, and the pole of the latter is connected to terminal D4, which is operatively connected to the coil of relay 286, as will be described in more detail presently. Up until the time relay 395 is actuated, the circuit closed by pole 397 is broken at microswitch 411, due to the fact that the poles of the relay and microswitch are closed to the opposite contacts. Thus, for example, if pole 397 is closed to contact I9, as shown in Figure 21, then the pole of the microswitch 411 is closed to contact I8, and contact I9 is open. When relay 395 is actuated, pole 397 is closed to the other contact, and the circuit is then completed through the microswitch 411.

At terminal D4, the current divides two ways, with one portion going up to the green indicator light 616, and then completing its circuit through fuse 635 to the line terminal O. The other portion of the current at terminal D4 is transmitted up to microswitch 353 and through microswitch 354, returning then to terminal D5. Terminal D5 is connected to the coil of relay 286, and the circuit is completed through terminal D3 and fuse 635 to line terminal O.

As previously described, the actuation of relay 286 closes the forward drive circuit to the shear motor 245, causing the latter to start up and run in the forward direction. Shear motor 245 runs until shut off by microswitch 411 when the latter is actuated by one of the increment cams on gear 235.

As the gear 235 rotates, screw shaft 200 is pulled toward the left, which pushes the shear box 42 toward the right until microswitch 356 is actuated, whereupon relay 288 is energized to start the load motor 325 in the forward direction so as to pull the shear box back toward the left. Microswitch 356 receives its current from terminal X2 on the electrical deck, said terminal being connected to microswitch 278, which is connected in turn to terminal X4. Terminal X4 is connected to microswitch 356, and when the latter is closed, current is carried to terminal A6, from which it is directed up to the middle pole of selector switch 279. Since switch 279 is closed to the right, the current is carried over to the left hand contact and is conducted down to terminal L4, where it divides two ways. One portion of the current at L4 goes up to the green indicator light 614 to light up the same, then completes the circuit through fuse 633 to line terminal O. The other portion of the current at terminal L4 travels over to microswitch 340, then down to terminal L5, over to microswitch 336, down to terminal L6, then over to the coil of relay 288 to energize the same; the circuit being completed through terminal L3 and fuse 633 to line terminal O. Actuation of relay 288 causes the forward drive circuit to the load motor 325 to be closed, which causes the load motor to run in the forward direction until microswitch 356 is reopened, disabling the relay 288.

To set up the machine for continuous loading, with the shear motor on automatic controls, selector switches 279 and 344 are thrown to positions A and II, respectively, and switch 607 is thrown over to the left, or the position designated "Increase."

When the starting switch 610 is thrown over to the "on" position, the current is brought up to terminal X2, as described in the previous set-ups, at which point the current is divided three ways, going to the bottom pole of selector switch 279, the bottom pole of selector switch 344, and terminal X2 on the electrical deck. At switch 279, the current is conducted over to the left hand contact which is connected to terminal B1. From B1, a portion of the current goes up to indicator light 622 to light up the same, while the balance of the current at B1 goes to the top pole of switch 344 where it is directed over to the contact at the right and is then carried back to terminal B4. From B4, the current goes up to the top pole of switch 607 and over to the contact at the left hand side thereof, returning then to terminal L4. From L4, a portion of the current goes up to the green indicator light 614 to light up the same, while the remainder of the current at terminal L4 goes over to microswitch 340 on the shear box, and is then brought down to terminal L5. Terminal L5 is connected to microswitch 336, and from there the current is returned from terminal L6, where it is transmitted to the coil of relay 288 to energize the same; the circuit being completed through terminal L3 and fuse 633 to line terminal O.

Relay 288, as explained before, closes the forward drive circuit to the load motor 325, causing the motor to run continuously in the forward direction until the sample shears through. As the load increases due to the forward operation of the load motor, the shear box is pulled to the left, closing microswitch 342, which energizes relay 286 and starts the shear motor 245 running forwardly to restore the shear box to its centered position.

The portion of the current which was transmitted to the bottom pole of switch 344 is carried over to the contact at the right, which is connected to terminal B3. From B3, the current is carried up to indicator light 625 to light up the same, completing the circuit through terminal I2 and fuse 634 to line terminal O.

The machine may be set up for continuous shearing deflection, with the load motor on automatic controls, by throwing selector switches 279 and 344 to positions B and II, respecively, and throwing switch 608 over to the left-hand side, designated "Increase." Here again, as in the preceding set-ups, the current is carried up to the bottom pole of selector switch 279; to the bottom pole of selector switch 344; and to terminal X2 on the electrical deck. From the bottom pole of switch 279, current is carried over to the contact at the right, which is connected to terminal B2. Here the current divides two ways, with one portion going up to indicator light 623 to light up the same, and the balance of the current at B2 being transmitted down to the middle pole of switch 344, where it is conducted over to the contact at the right and then brought down to terminal B5. Terminal B5 is connected to the top pole of switch 608, and the said pole is closed to the contact at the left, which is connected to terminal D4. A portion of the current at D4 goes up to green indicator light 616 to light up the same, and completes its circuit through terminal D3 and fuse 635 to line terminal O. The remainder of the current at D4 goes to microswitch 353, then to microswitch 354, and down to terminal D5 which is connected to the coil of relay 286; the circuit being completed through terminal D3 and fuse 635 to line terminal O. When relay 286 is energized, the forward drive circuit of the shear motor 245 is completed, causing the shear motor to run continuously in the forward direction until the sample shears through. As the shearing deflection proceeds, the shear box is pulled to the right, closing microswitch 356, which energizes relay 288 and starts the load motor 325 forwardly. The load motor is shut off when the shear box has been pulled back toward the left, opening microswitch 356.

When the load switch 607 is thrown over to the right-hand side, designated "Decrease," the load motor is driven in reverse instead of forward. In this case, current from the middle pole is conducted to terminal L1, then over to microswitch 344, and back to terminal L2 on the electrical deck. From terminal L2, the current is carried to the coil of relay 289 to energize the same, and completes its circuit through terminal L3 and fuse 633 to line terminal O.

When relay 289 is energized, current is transmitted to the load motor 325 as described earlier, except that the path of the current through the field windings of the motor is reversed, which causes the motor to run in the reverse direction. Relay 289 may also be energized when the limit switch 337 is closed, in which case current is transmitted directly from line terminal X to terminal L2, and thence to the coil of relay 289; or when automatic switch 342 is closed while the shear motor is running either continuously or by increments in reverse, in which case switch 279 would be at B, and switch 608 would be closed to the right hand contact.

The contact of switch 342 is connected to terminal A5, and the latter is connected to the top pole of selector switch 279. When the switch is at B position, current from the top pole is transmitted over to the right hand contact, which is connected through terminal L1, microswitch 344, and terminal L2 to the coil of relay 289.

The shear motor 245 is driven in reverse instead of forward, when the switch 608 is closed to the right hand side, designated "Decrease," in which case relay 287 is actuated instead of relay 286. Current is transmitted from the center post of switch 608 over to the right hand contact, and then down to terminal D1. From D1 on the electrical deck, the current is carried through the serially connected, normally closed microswitches 350 and 346 to terminal D2; and thence to the coil of relay 287 to energize the same. The circuit for the coil of relay 287 is completed through terminal D3 and fuse 635 to line terminal O.

When relay 287 is energized, current is transmitted to the shear motor 245, as described earlier, except that the path of the current through the field windings of the motor is reversed in direction, which causes the motor to run in reverse. Relay 287 may also be energized when automatic switch 356 is closed while the load motor is running in reverse, in which case switch 279 would be at A, and switch 607 would be closed to the right hand contact.

The contact of switch 356 is connected to terminal A6, and the latter is connected to the center pole of selector switch 279. When the switch is at position A, current from the center pole is transmitted over to the left hand contact, which is connected through terminal D1, microswitch 350 and 346, and terminal D2 to the coil of relay 287.

Friction tests for determining the frictional strength of a soil sample in contact with pile material, or of some other substance in contact with the sides of a bin or hopper, may be made in the same manner as in the shearing tests just described, except that a disk of the material of which the pile or bin is made is substituted for the soil or other substance in the center ring. Thus, if a pile is to be of steel, for example, a disk of steel is placed in the center ring 52 between the previously sheared surfaces of two disks of soil contained within the outer rings 51 and 53. A suitable surcharge pressure, corresponding to the pressure that will be exerted by the soil in a normal direction against the surface of the pile at the depth in question, is thus applied to the ends of the sample; after which the center ring is pulled out from between the end rings. The friction strength of the soil sample tested is equal to the applied force at which the disk begins to slide, divided by twice the cross-sectional area of the core.

It is believed that the construction, electrical circuit, and mode of operation of the soil testing machine illustrated and described herein will be clearly understood from the foregoing, and that the many objects and advantageous features of the invention will be recognized by those skilled in the art. While we have shown and described in considerable detail what we believe to be the preferred embodiments of our invention, it is to be understood that such details are merely illustrative, and not to be considered restrictive in any sense, since many changes in the shape and arrangement of the several parts may be made without departing from the broad scope of the invention, as defined in the appended claims.

We claim:

1. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, means for applying a constant, predetermined surcharge pressure to the ends of said sample, a movable member mounted for free translation in a direction parallel to the line of travel of said movable holder, motor driven means mounted on said movable member and connected to said center holder for moving the same to produce shearing deflection of the center ring with respect to the outer rings of the sample, said movable member having a tendency to be drawn toward said sample as a result of the operation of said motor driven means, other motor driven means for exerting a shearing load force on said movable member in the direction away from said sample, automatic control means responsive to movement of said movable member for operating one or the other of said motor driven means so as to maintain said movable member in a substantially fixed position, and means for recording the shearing deflection vs. load and surcharge vs. load relationships obtained in the sample during the progress of the test.

2. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable member mounted for free translation in a direction parallel to the line of travel of said movable holder, motor driven means mounted on said movable member and connected to said center holder for moving the same to produce shearing deflection of the center ring with respect to the outer ring of the sample, said movable member having a tendency to be drawn toward said sample as a result of the operation of said motor driven means, and means for exerting a shearing load force on said movable member substantially equal in magnitude and opposite in direction to the force tending to pull said member toward said sample, whereby said movable member is maintained in a substantially fixed position at all times during the progress of the test.

3. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable member mounted for free translation in a direction parallel to the line of travel of said movable holder, motor driven means mounted on said movable member and connected with said center holder for moving the same to produce shearing deflection of the center ring with respect to the outer rings of the sample, said movable member having a tendency to be drawn toward said sample as a result of the operation of said motor driven means, means for exerting a shearing load force on said movable member in the direction away from said sample, said last-named means including a spring attached to said movable member, motor driven means for stressing said spring, and automatic control means responsive to movement of said movable member for operating one or the other of said motor driven means so as to maintain said movable member in a substantially fixed position.

4. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable box mounted for free translation in a direction parallel to the line of travel of said movable holder, an axially movable shaft disposed within said box parallel to the direction of travel thereof and projecting from one end of the box, said projecting end being connected to said center holder, whereby movement of the shaft produces shearing deflection of the center ring with respect to the outer rings of the sample, a motor mounted in said box and operatively connected to said shaft to move the same, said box having a tendency to be drawn toward said sample as a result of the movement of said shaft, and means for exerting a shearing load force on said movable box substantially equal in magnitude and opposite in direction to the force tending to pull said box toward said sample, whereby said movable box is maintained in a substantially fixed position at all times during the progress of the test.

5. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable box mounted for free translation in a direction parallel to the line of travel of said movable holder, an axially movable screw shaft disposed within said box parallel to the direction of travel thereof and projecting from one end of the box, said projecting end being connected to said center holder, whereby movement of the shaft produces shearing deflection of the center ring with respect to the outer rings of the sample, a gear wheel mounted on said screw shaft and having threaded engagement therewith, means constraining said gear wheel against axial movement with respect to said box, other means constraining said screw shaft against rotational movement while permitting axial movement thereof, a motor operatively connected to said gear wheel to drive the same, said box having a tendency to be drawn toward said sample as a result of the movement of said screw shaft, and means for exerting a shearing load force on said movable box substantially equal in magnitude and opposite in direction to the force tending to pull said box toward said sample, whereby said movable box is maintained in a substantially fixed position at all times during the progress of the test.

6. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable member mounted for free translation in a direction parallel to the line of travel of said movable holder, motor driven means mounted on said movable member and connected with said center holder for moving the same to produce shearing deflection of the center ring with respect to the outer rings of the sample, said movable member having a tendency to be drawn toward said sample as a result of the operation of said motor driven means, a carriage disposed on the side of said movable member opposite said sample, said carriage being mounted for translational movement in a direction parallel to the line of travel of said movable member, a spring connecting said carriage to said movable member, and an electric motor operatively connected to said carriage to move the same away from said movable member, thereby stretching said spring and exerting a shearing load force on said movable member in the direction away from said sample.

7. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable member mounted for free translation in a direction parallel to the line of travel of said movable holder, motor driven means mounted on said movable member and connected with said center holder for moving the same to produce shearing deflection of the center ring with respect to the outer rings of the sample, said movable member having a tendency to be drawn toward said sample as a result of the operation of said motor driven means, a pair of lead screws extending parallel to the line of travel of said movable member, a carriage mounted on said lead screws for axial movement thereon, said carriage having threaded engagement with said lead screws, whereby rotation of the latter in one direction causes said carriage to move away from said movable member, a spring connected at one end to said carriage and at the other end to said movable member, and a motor operatively connected to said lead screws to drive the same in said one direction, thereby stretching said spring and exerting a shearing load force on said movable member in the direction away from said sample.

8. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable box mounted for free translation in a direction parallel to the line of travel of said movable holder, operating means mounted on said box and connected with said center holder for moving the same to produce shearing deflection of the center ring with respect to the outer rings of the sample, an electric motor for driving said operating means, said box having a tendency to be drawn toward said sample as a result of the operation of said motor driven means, loading means connected to said box and operable to exert a shearing load force thereon tending to move the box away from said sample, another electric motor for driving said loading means, and an automatic control microswitch mounted on top of said box and engageable by a stationary limit stop when said box is pulled toward said sample by said first-named motor, said microswitch being operable to start up said last-named motor so as to pull said box back to its initial position.

9. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable box mounted for free translation in a direction parallel to the line of travel of said movable holder, an axially movable shaft disposed within said box parallel to the direction of travel thereof and projecting from one end of the box, said projecting end being connected to said center holder, whereby movement of the shaft produces shearing deflection of the center ring with respect to the outer rings of the sample, an electric motor mounted in said box and operatively connected to said shaft to move the same, said box having a tendency to be drawn toward said sample as a result of the movement of said shaft, a carriage disposed on the side of said movable member opposite said sample, said carriage being mounted for translational movement in a direction parallel to the line of travel of said movable box, a spring connecting said carriage to said movable member, another electric motor operatively connected to said carriage to move the same away from said box, thereby stretching said spring and exerting a shearing load force on said box tending to pull the same away from said sample, a pair of oppositely facing microswitches mounted on top of said box, one of said microswitches being operable to start up said last-named motor when said box is pulled toward said sample by the operation of said first-named motor, and the other microswitch being operable to start up said first-named motor when the box is pulled away from said sample by the operation of said last-named motor, and selector switch means operable to cause one of said motors to run in a predetermined manner, and the other motor to run as required, under the control of its associated microswitch.

10. A materials testing machine for shearing a cylindrical, sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable box mounted for free translation in a direction parallel to the line of travel of said movable holder, an axially movable screw shaft disposed within said box parallel to the direction of travel thereof and projecting from one end of the box, said projecting end being connected to said center holder, whereby movement of the shaft produces shearing deflection of the center ring with respect to the outer rings of the sample, a gear wheel mounted on said screw shaft and having threaded engagement therewith, means constraining said gear wheel against axial movement with respect to said box, other means constraining said screw shaft against rotational movement while permitting axial movement thereof, a motor operatively connected to said gear wheel to drive the same, said box having a tendency to be drawn toward said sample as a result of the movement of said screw shaft, a timer operable to send out current impulses at predetermined intervals of time, relay means actuated by said current impulses for closing and holding the electrical circuit to said motor to operate the same, cam means mounted on said gear wheel to rotate therewith, a switch connected into the circuit of said relay means and actuated by said cam means to stop said motor when said gear wheel has turned through a predetermined angular distance, and automatically controlled motor-driven means for exerting a shearing load force on said movable box substantially equal in magnitude and opposite in direction to the force tending to pull said box toward said sample, whereby said movable box is maintained in a substantially fixed position at all times during the progress of the test.

11. A materials testing machine for shearing a cylindrical sample contained within three adjoining, separable rings, said machine comprising, in combination, a pair of laterally spaced, relatively stationary holders adapted to receive and support the outer end rings of said sample, a movable holder engageable with the center ring thereof, said movable holder being movable in a direction perpendicular to the axis of the sample, a movable member mounted for free translation in a direction parallel to the line of travel of said movable holder, a carriage disposed on the side of said movable member opposite said sample, said carriage being mounted for translational movement in a direction parallel to the line of travel of said movable member, a spring connecting said carriage to said movable member, an electric motor operatively connected to said carriage to move the same away from said movable member, thereby stretching said spring and exerting a shearing load force on said movable member in the direction away from said sample, a timer operable to send out current impulses at predetermined intervals of time, relay means actuated by said current impulses for closing and holding the electrical circuit to said motor to operate the same, cam means mounted on said carriage and movable therewith, a switch connected into the circuit of said relay means and actuated by said cam means to stop said motor when said carriage has traveled a predetermined distance, and automatically controlled motor-driven means connected with said center holder for moving the same to produce shearing deflection of the center ring with respect to the outer rings of the sample, said shearing deflection causing a force to be exerted on said movable member substantially equal in magnitude and opposite in direction to the shearing load force exerted on said movable member by said stretched spring, whereby said movable member is maintained in a substantially fixed position at all times during the progress of the test.

12. In a materials testing machine for shearing a cylindrical sample contained within three adjoining, separable rings, means for applying a substantially constant predetermined surcharge pressure to the ends of said sample comprising a pair of end plates engageable with the ends of the sample, a pair of spring plates engageable with said end plates to press the latter against the ends of said sample, a pair of screw plates spaced outwardly from said spring plates, compression springs disposed between and bearing at opposite ends against said screw plates and said spring plates, lead screws having threaded engagement with said screw plates, whereby rotation of the lead screws causes said screw plates to move together so as to compress said springs, a motor operatively connected to said lead screws to drive the same, and means for automatically controlling said motor so as to maintain said springs under a predetermined amount of deflection.

13. In a materials testing machine for shearing a cylindrical sample contained within three adjoining, separable rings, means for applying a substantially constant predetermined surcharge pressure to the ends of said sample comprising a pair of end plates engageable with the ends of the sample, a pair of spring plates engageable with said end plates to press the latter against the ends of said sample, a pair of screw plates spaced outwardly from said spring plates, compression springs disposed between and bearing at opposite ends against said screw plates and said spring plates, lead screws having threaded engagement with said screw plates, whereby rotation of the lead screws causes said screw plates to move together so as to compress said springs, a reversible electric motor operatively connected to said lead screws to drive the same, an adjusting screw threaded into one of said screw plates and projecting toward its associated spring plate, and switch means actuated by said adjusting screw for stopping said electric motor when said springs have been compressed to a predetermined amount of deflection, said switch means being operable to run said motor in reverse responsive to deflection of said springs beyond said predetermined amount.

14. In a materials testing machine for shearing a cylindrical sample contained within three adjoining, separable rings, means for applying a substantially constant predetermined surcharge pressure to the ends of said sample comprising a pair of end plates engageable with the ends of the sample, a pair of spring plates engageable with said end plates to press the latter against the ends of said sample, a pair of screw plates spaced outwardly from said spring plates, compression springs holding said screw plates apart from said spring plates, lead screws having threaded engagement with said screw plates, whereby rotation of the lead screws causes said screw plates to move together so as to compress said springs, a reversible electric motor operatively connected to said lead screws to drive the same, an adjusting screw threaded into one of said screw plates and projecting toward its associated spring plate, a relay operative to close the forward drive circuit of said motor, another relay operative to close the reverse drive circuit of the motor, a normally closed microswitch which is opened by said screw when said springs have been compressed to a predetermined deflection, said microswitch being operatively connected to said first-named relay so as to open said forward drive circuit and stop said motor when the switch is opened, a normally open microswitch which is adapted to be closed by said screw when said springs have been compressed beyond said predetermined deflection, said last-named microswitch being operatively connected to said last-named relay so as to close said reverse drive circuit and run said motor in reverse until the switch is reopened.

15. In a materials testing machine for shearing a cylindrical sample contained within three adjoining, separable rings, means for applying a substantially constant predetermined surcharge pressure to the ends of said sample comprising a pair of end plates engageable with the ends of the sample, spring plates engageable with said end plates to press the latter against the end of the sample, screw plates spaced outwardly from said spring plates, compression springs disposed between said screw plates and said spring plates for yieldingly holding the same apart, lead screws having threaded engagement with said screw plates, an electric motor operatively connected to said lead screws to drive the same, a limit switch box mounted on one of said spring plates, a resilient cover plate supported solely at its ends on said box, an adjusting screw threaded into the screw plate spaced outwardly from the last mentioned spring plate and projecting toward said spring plate, the end of said screw being engageable with said cover plate to bow the same inwardly when said springs have been compressed to a predetermined deflection, and switch means contained within said box and actuated by said cover plate when the latter is bowed inwardly to stop said motor.

16. In a materials testing machine for shearing a cylindrical sample contained within three adjoining, separable rings, means for applying a substantially constant predetermined surcharge pressure to the ends of said sample comprising a pair of end plates engageable with the ends of the sample, spring plates engageable with said end plates to press the latter against the end of the sample, screw plates spaced outwardly from said spring plates, compression springs disposed between said screw plates and said spring plates for yieldingly holding the same apart, lead screws having threaded engagement with said screw plates, a reversible electric motor operatively connected to said lead screws to drive the same, a limit switch box mounted on one of said spring plates, a resilient cover plate supported solely at its ends on said box, an adjusting screw threaded into the screw plate spaced outwardly from the last mentioned spring plate and projecting toward said spring plate, the end of said screw being engageable with said cover plate at its midpoint to bow the same inwardly when said springs have been compressed to a predetermined deflection, and a pair of switches contained within said box and actuated by said cover plate when the latter is bowed inwardly, one of said switches being operative to stop the forward operation of said motor when said springs have been compressed to said predetermined deflection, and the other switch being operative to drive said motor in reverse when said springs have been compressed beyond said predetermined deflection.

17. In a materials testing machine for shearing a cylindrical sample contained within three adjoining, separable rings, means for applying a substantially constant predetermined surcharge pressure to the ends of said sample comprising a pair of end plates engageable with the ends of the sample, spring plates engageable with said end plates to press the latter against the end of the sample, screw plates spaced outwardly from said spring plates, compression springs disposed between said screw plates and said spring plates for yieldingly holding the same apart, lead screws having threaded engagement with said screw plate, a reversible electric motor operatively connected to said lead screws to drive the same, a limit switch box mounted on one of said spring plates and having a resilient cover on the outer end thereof, said cover having knife edge supports at its opposite ends which rest on the edges of the box ends, an adjusting screw threaded into the screw plate spaced outwardly from the last mentioned spring plate and projecting toward said spring plate, the end of said screw being engageable with said cover plate at its midpoint to bow the same inwardly when said springs have been compressed to a predetermined deflection, a pair of laterally spaced, longitudinally extending fingers attached to one end of said cover plate, the free ends of said fingers being swingable inwardly toward the bottom of the box when said cover plate is bowed inwardly, and a pair of microswitches contained within said box, the operating plungers of said microswitches being engageable by said fingers when said cover plate is bowed inwardly to operate the switch, one of said microswitches being operative to stop the forward operation of said motor when said springs have been compressed to said predetermined deflection, and the other microswitch being operative to drive said motor in reverse when said springs have been compressed beyond said predetermined deflection.

18. In a materials testing machine for shearing a cylindrical sample contained within three adjoining, separable rings, said machine comprising, in combination, a pair of laterally spaced, relatively stationary holders adapted to receive and support the outer end rings of said sample, a movable center holder engageable with the center ring thereof, said center holder being movable in a direction perpendicular to the axis of the sample, a movable member mounted for free translation in a direction parallel to the line of travel of said movable holder, motor-driven means mounted on said movable member and connected with said center holder for moving the same to produce shearing deflection of the center ring with respect to the outer rings of the sample, said movable member having a tendency to be drawn toward said sample as a result of the operation of said motor-driven means, means for exerting a shearing load force on said movable member substantially equal in magnitude and opposite in direction to the force tending to pull said member toward said sample, said last-named means including a movable carriage spring-connected to said member and having a surface adapted to support a sheet of coordinate paper, a recorder unit comprising a stylus carrier supported for movement across said sheet of paper transverse to the direction of travel of said carriage, said stylus carrier having a spring-retracted stylus which is adapted to make a mark on said paper when depressed, means for driving said stylus carrier from said motor-driven means producing said shearing deflection, and means for periodically depressing said stylus so as to make a series of marks on said paper representing the shearing deflection vs. shearing load relationship obtained in said sample during the progress of the test.

19. In a materials testing machine for shearing a cylindrical sample contained within three adjoining, separable rings, said machine comprising, in combination, a pair of laterally spaced, relatively stationary holders adapted to receive and support the outer end rings of said sample, a movable center holder engageable with the center ring thereof, said center holder being movable in a direction perpendicular to the axis of the sample, a movable member mounted for free translation in a direction parallel to the line of travel of said movable holder, motor-driven means mounted on said movable member and connected with said center holder for moving the same to produce shearing deflection of the center ring with respect to the outer rings of the sample, said movable member having a tendency to be drawn toward said sample as a result of the operation of said motor-driven means, means for exerting a shearing load force on said movable member substantially equal in magnitude and opposite in direction to the force tending to pull said member toward said sample, said last-named means including a movable carriage having a surface adapted to support a sheet of coordinate paper, a recorder unit comprising an endless tape trained around a pair of rotatable pulleys of equal diameter, said pulleys being disposed directly above said sheet of paper and spaced apart transverse to the direction of travel of said carriage, the length of said tape being exactly equal to three times the circumference of one of said pulleys, three stylus carriers attached to said tape, each of said carriers having a spring-retracted stylus which is adapted to make a mark on said paper when depressed, means for driving said pulleys from said motor-driven means producing said shearing deflection, and means for periodically depressing said styli as said carriers travel along one of the straight edges of said unit between said pulleys, so as to make a series of marks on said paper representing the shearing deflection vs. shearing load relationship obtained in said sample during the progress of the test.

20. A materials testing machine for shearing a cylindrical sample contained within three adjoining, separable rings, said machine comprising, in combination, stationary means for holding the outer end rings of said sample, a movable holder engageable with the center ring thereof, said holder being movable in a direction at right angles to the axis of the sample, motor-driven means for applying a constant, predetermined surcharge pressure to the ends of said sample, a movable member mounted for free translation in a direction parallel to the line of travel of said movable holder, motor-driven means mounted on said movable member and connected with said holder for moving the latter to produce shearing deflection of the center ring with respect to the outer rings of the sample, said movable member having a tendency to be drawn toward said sample as a result of the operation of said motor-driven means, other motor-driven means for exerting a shearing load force on said movable member substantially equal in force and opposite in direction to the force tending to pull said member toward sample, said last-named means including a movable carriage spring-connected to said movable member and having a surface adapted to support a sheet of coordinate paper, a pair of recorder units extending across said carriage above said paper, each of said units including a stylus carrier supported for movement across said sheet of paper transverse to the direction of travel of said carriage, each of said stylus carriers having a spring-retracted stylus which is adapted to make a mark on said paper when depressed, means for driving the stylus carrier of one of said units from said motor-driven means producing said shearing deflection, means for driving the stylus carrier of the other unit from said motor-driven means for applying said surcharge pressure, a vertically movable ram bar disposed above said carriers and engageable simultaneously with both of the styli thereof to depress the same, and means for periodically bringing said ram bar down against said styli so as to make a series of marks on said paper, the marks made by said one unit representing the shearing deflection vs. shearing load relationship, and those made by said other unit representing the surcharge vs. shearing load relationship obtained in the sample during the progress of the test.

21. A materials testing machine for shearing a cylindrical sample contained within three adjoining, separable rings, said machine comprising, in combination, means for holding the outer end rings of said sample stationary, a movable holder engageable with the center ring thereof, said holder being movable in a direction perpendicular to the axis of the sample, motor-driven means for applying a constant, predetermined surcharge pressure to the ends of said sample, a movable member mounted for free translation in a direction parallel to the line of travel of said movable holder, motor-driven means mounted on said movable member and connected with said holder for moving the latter to produce shearing deflection of the center ring with respect to the outer rings of the sample, said movable member having a tendency to be drawn toward said sample as a result of the operation of said motor-driven means, other motor-driven means for exerting a shearing load force on said movable member substantially equal in magnitude and opposite in direction to the force tending to pull said member toward said sample, said last-named means including a movable carriage spring-connected to said movable member and having a surface adapted to support a sheet of coordinate paper, a pair of recorder units extending across said carriage above said paper, each of said units comprising a pair of pulleys, an endless tape trained around each pair of pulleys, a plurality of equi-distantly spaced stylus carriers mounted on each of said tapes and movable therewith across said sheet of paper transverse to the direction of travel of said carriage, said units being spaced apart longitudinally from one another and tilted in opposite directions, with the lower side edges of said units substantially aligned, each of said carriers having a spring-retracted stylus disposed at an angle such that the stylus is vertical while the carrier travels along the low side of the unit, said stylus being adapted to make a mark on said paper when depressed, means for driving the pulleys of one of said units from said motor-driven means producing said shearing deflection, means for driving the pulleys of the other unit from said motor-driven means for applying said surcharge pressure, a timer operable to send out current impulses at predetermined intervals of time, and means responsive to said current impulses for simultaneously depressing the styli traveling along the low sides of both units, the marks made by said one unit representing the shearing deflection vs. shearing load relationship, and the marks made by said other unit representing the surcharge vs. shearing load relationship obtained in the sample during the progress of the test.

22. A materials testing machine for shearing a cylindrical sample contained within three adjoining, separable rings, said machine comprising means for holding the outer end rings of said sample stationary, a movable holder engageable with the center ring thereof, said holder being movable in a direction perpendicular to the axis of the sample, a shear box supported for translational movement in a direction parallel to the line of travel of said movable holder, an axially movable screw shaft disposed within said shear box parallel to the direction of travel thereof and projecting from one end of the box, said projecting end being connected to said movable holder, whereby movement of the shaft produces shearing deflection of the center ring with respect to the outer rings of the sample, a gear wheel mounted on said screw shaft and having threaded engagement therewith, means constraining said gear wheel against axial movement with respect to said shear box, other means constraining said screw shaft against rotation while permitting axial movement thereof, a shear motor operatively connected to said gear wheel to drive the same, said shear box having a tendency to be drawn toward said sample as a result of the movement of said screw shaft, a carriage disposed on the side of said shear box opposite said sample and supported for movement in a direction parallel to the line of travel of said shear box, a spring connecting said carriage to said shear box, a load motor operatively connected to said carriage to move the same away from said shear box, thereby stretching said spring and exerting a shearing load force on the shear box in the direction away from said sample, a timer operable to give out current impulses at predetermined intervals of time, circuit means including a relay actuated by said current impulses for starting said load motor, a load increment cam mounted on said carriage and movable therewith, a microswitch engageable by said cam to disable said relay and shut off the load motor when said carriage has traveled a predetermined distance, and automatic control switch means responsive to movement of said shear box due to the operation of said load motor for operating said shear motor to pull said shear box back to its initial position.

23. A materials testing machine for shearing a cylindrical sample contained within three adjoining, separable rings, said machine comprising means for holding the outer end rings of said sample stationary, a movable holder engageable with the center ring thereof, said holder being movable in a direction perpendicular to the axis of the sample, a shear box supported for translational movement in a direction parallel to the line of travel of said movable holder, an axially movable screw shaft disposed within said shear box parallel to the direction of travel thereof and projecting from one end of the box, said projecting end being connected to said movable holder, whereby movement of the shaft produces shearing deflection of the center ring with respect to the outer rings of the sample, a gear wheel mounted on said screw shaft and having threaded engagement therewith, means constraining said gear wheel against axial movement with respect to said shear box, other means constraining said screw shaft against rotation while permitting axial movement thereof, a shear motor operatively connected to said gear wheel to drive the same, said shear box having a tendency to be drawn toward said sample as a result of the movement of said screw shaft, a carriage disposed on the side of said shear box opposite said sample and supported for movement in a direction parallel to the line of travel of said shear box, a spring connecting said carriage to said shear box, a load motor operatively connected to said carriage to move the same away from said shear box, thereby stretching said spring and exerting a shearing load force on the shear box in a direction away from said sample, a timer operable to give out current impulses at predetermined intervals of time, circuit means including a relay actuated by said current impulses for starting said shear motor, a shearing deflection increment cam mounted on said gear wheel and rotatable therewith, a microswitch engageable by said cam to disable said relay and shut off the shear motor when said gear wheel has turned through a predetermined angular distance, and automatic control switch means responsive to movement of said shear box due to the operation of said shear motor for operating said load motor to pull said shear box back to its initial position.

24. A materials testing machine for shearing a cylindrical sample contained within three adjoining, separable rings, said machine comprising means for holding the outer end rings of said sample stationary, a movable holder engageable with the center ring thereof, said holder being movable in a direction perpendicular to the axis of the sample, a shear box supported for translational movement in a direction parallel to the line of travel of said movable holder, an axially movable screw shaft disposed within said shear box parallel to the direction of travel thereof and projecting from one end of the box, said projecting end being connected to said movable holder, whereby movement of the shaft produces shearing deflection of the center ring with respect to the outer rings of the sample, a gear wheel mounted on said screw shaft and having threaded engagement therewith, means constraining said gear wheel against axial movement with respect to said shear box, other means constraining said screw shaft against rotation while permitting axial movement thereof, a shear motor operatively connected to said gear wheel to drive the same, said shear box having a tendency to be drawn toward said sample as a result of the movement of said screw shaft, a carriage disposed on the side of said shear box opposite said sample and supported for movement in a direction parallel to the line of travel of said shear box, a spring connecting said carriage to said shear box, a load motor operatively connected to said carriage to move the same away from said shear box, thereby stretching said spring and exerting a shearing load force on the shear box in the direction away from said sample, circuit means for operating said load motor continuously from the start of the test to the end thereof, and automatic control switch means responsive to movement of said shear box due to the operation of said load motor for operating said shear motor to pull the shear box back to its initial position.

25. A materials testing machine for shearing a cylindrical sample contained within three adjoining, separable rings, said machine comprising means for holding the outer end rings of said sample stationary, a movable holder engageable with the center ring thereof, said holder being movable in a direction perpendicular to the axis of the sample, a shear box supported for translational movement in a direction parallel to the line of travel of said movable holder, an axially movable screw shaft disposed within said shear box parallel to the direction of travel thereof and projecting from one end of the box, said projecting end being connected to said movable holder, whereby movement of the shaft produces shearing deflection of the center ring with respect to the outer rings of the sample, a gear wheel mounted on said screw shaft and having threaded engagement therewith, means constraining said gear wheel against axial movement with respect to said shear box, other means constraining said screw shaft against rotation while permitting axial movement thereof, a shear motor operatively connected to said gear wheel to drive the same, said shear box having a tendency to be drawn toward said sample as a result of the movement of said screw shaft, a carriage disposed on the side of said shear box opposite said sample and supported for movement in a direction parallel to the line of travel of said shear box, a spring connecting said carriage to said shear box, a load motor operatively connected to said carriage to move the same away from said shear box, thereby stretching said spring and exerting a shearing load force on the shear box in the direction away from said sample, circuit means for operating said shear motor continuously from the start of the test to the end thereof, and automatic control switch means responsive to movement of said shear box due to the operation of said shear motor for operating said load motor to pull said shear box back to its initial position.

26. A materials testing machine for shearing a cylindrical sample contained within three adjoining, separable rings, said machine comprising, in combination, stationary means for holding the outer end rings of said sample, a movable holder engageable with the center ring thereof, said holder being movable in a direction at right angles to the axis of the sample, motor-driven means for applying a constant, predetermined surcharge pressure to the ends of said sample, a movable member mounted for free translation in a direction parallel to the line of travel of said movable holder, motor-driven means mounted on said movable member and connected with said holder for moving the latter to produce shearing deflection of the center ring with respect to the outer rings of the sample, said movable member having a tendency to be drawn toward said sample as a result of the operation of said motor-driven means, other motor-driven means for exerting a shearing load force on said movable member substantially equal in force and opposite in direction to the force tending to pull said member toward said sample, said last-named means including a movable carriage spring-connected to said movable member and having a surface adapted to support a sheet of coordinate paper, a pair of recorder units extending across said carriage above said paper, each of said units including a stylus carrier supported for movement across said sheet of paper transverse to the direction of travel of said carriage, each of said stylus carriers having a spring-retracted stylus which is adapted to make a mark on said paper when depressed, means for driving the stylus carrier of one of said units from said motor-driven means producing said shearing deflection, means for driving the stylus carrier of the other unit from said motor-driven means for applying said surcharge pressure, and means operable to depress the styli of both of said carriers simultaneously at predetermined intervals of time so as to make a series of marks on said paper, the marks made by said one unit representing the shearing deflection vs. shearing load relationship, and those made by said other unit representing the surcharge vs. shearing load relationship obtained in the sample during the progress of the test.

27. A materials testing machine for shearing a cylindrical sample contained within three adjoining, separable rings, comprising: ring supporting means for supporting the two outer of the three rings on a common longitudinal axis, the middle ring being movable relatively to the outer rings along a direction line perpendicular to said axis, a movable control member mounted for limited displacement from and toward a predetermined equilibrium position, said control member being operatively linked to said middle ring to load and move said ring along said direction line upon displacement of said control member in a given direction, whereby to displace said middle ring in a corresponding direction relative to said outer rings and to correspondingly shear the sample, sample loading means including power means for exerting a varying loading force on said control member for effecting said displacement of said control member in said given direction and for transmission and application to said middle ring to effect said shearing of said sample, deflection means including power means for effecting relative displacement movement between the middle and the two outer rings along said direction line, but in the direction reverse to the first mentioned displacement of said rings, and for simultaneously moving said control member in a direction opposite to its movement by said sample loading means, means for setting one of said power means in independent operation, and means responsive to displacement of said control means from said equilibrium position for setting the other power means into dependent operation.

28. A materials testing machine for shearing a cylindrical sample contained within three adjoining, separable rings, comprising: ring supporting means for supporting the two outer of the three rings on a common longitudinal axis, the middle ring being movable relatively to the outer rings along a direction line perpendicular to said axis, a movable control member mounted for limited displacement from and toward a predetermined equilibrium position, said control member being operatively linked to said middle ring to load and move said ring along said direction line upon displacement of said control member in a given direction, whereby to displace said middle ring in a corresponding direction relative to said outer rings and to correspondingly shear the sample, sample loading means including power means for exerting a varying loading force on said control member for effecting said displacement of said control member in said given direction and for transmission and application to said middle ring to effect said shearing of said sample, deflection means including power means for effecting relative return movement between the middle and the two outer rings along said direction line and for simultaneously moving said control member in a direction opposite to its movement by said sample loading means, means for setting the power means of the sample loading means into independent operation in a manner to effect displacement of said control means from said equilibrium position in the direction to increase the loading force exerted on the middle ring, and means operative in response to such displacement of said control means for setting the power means of the deflecting means into dependent operation in a manner to return said control means toward said equilibrium position.

29. A materials testing machine for shearing a cylindrical sample contained within three adjoining, separable rings, comprising: ring supporting means for supporting the two outer of the three rings on a common longitudinal axis, the middle ring being movable relatively to the outer rings along a direction line perpendicular to said axis, a movable control member mounted for limited displacement from and toward a predetermined equilibrium position, said control member being operatively linked to said middle ring to load and move said ring along said direction line upon displacement of said control member in a given direction, whereby to displace said middle ring in a corresponding direction relative to said outer rings and to correspondingly shear the sample, sample loading means including power means for exerting a varying loading force on said control member for effecting said displacement of said control member in said given direction and for transmission and application to said middle ring to effect said shearing of said sample, deflection means including power means for effecting relative displacement movement in the reverse direction between the middle and the two outer rings along said direction line, but in the direction reverse to the first mentioned displacement of said rings, and for simultaneously moving said control member in a direction opposite to its movement by said sample loading means, means for setting the power means of the sample deflecting means into independent operation in a manner to effect deflection of said middle ring and also displacement of said control member from its said equilibrium position, and means responsive to such displacement of said control member for setting the power means of the sample loading means into dependent operation in a manner to return said control means toward said equilibrium position.

TRENT R. DAMES.
WILLIAM W. MOORE.
JOHN W. MALONEY.

References Cited in the file of this patent

UNITED STATES PATENTS

| Number | Name | Date |
|---|---|---|
| 427,215 | Baldwin | May 6, 1890 |
| 1,695,046 | Hippensteel | Dec. 11, 1928 |
| 2,227,226 | Martin | Dec. 31, 1940 |
| 2,278,416 | Atti | Apr. 7, 1942 |
| 2,296,466 | Dames et al. | Sept. 22, 1942 |
| 2,353,056 | Martindell | July 4, 1944 |
| 2,414,550 | Patch | Jan. 21, 1947 |